(12) United States Patent  
Crouch et al.

(10) Patent No.: US 11,714,173 B2
(45) Date of Patent: *Aug. 1, 2023

(54) LIDAR SYSTEM FOR AUTONOMOUS VEHICLE

(71) Applicant: Blackmore Sensors & Analytics, LLC, Palo Alto, CA (US)

(72) Inventors: Stephen C. Crouch, Bozeman, MT (US); Edward Joseph Angus, Bozeman, MT (US); Michelle Milvich, Livingston, MT (US)

(73) Assignee: BLACKMORE SENSORS & ANALYTICS, LLC, Palo Alto, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 17/099,982

(22) Filed: Nov. 17, 2020

(65) Prior Publication Data

US 2021/0255290 A1 Aug. 19, 2021

Related U.S. Application Data

(63) Continuation of application No. 16/725,349, filed on Dec. 23, 2019, now Pat. No. 10,866,312, which is a (Continued)

(51) Int. Cl.
*G01S 7/493* (2006.01)
*G01S 17/931* (2020.01)
(Continued)

(52) U.S. Cl.
CPC ............ *G01S 7/493* (2013.01); *G01S 7/4817* (2013.01); *G01S 7/4911* (2013.01);
(Continued)

(58) Field of Classification Search
CPC ....... G01S 7/493; G01S 17/931; G01S 7/4817
See application file for complete search history.

(56) References Cited

U.S. PATENT DOCUMENTS 1,086,312 A * 2/1914 Blaha .................... F16L 37/096
285/322
5,371,358 A * 12/1994 Chang ...................... G01J 3/28
250/236

(Continued)

FOREIGN PATENT DOCUMENTS

WO WO-2018/107237 A1 6/2018
WO WO-2018/144853 A1 8/2018
(Continued)

OTHER PUBLICATIONS

International Preliminary Report on Patentability and Written Opinion on PCT Appl. Ser. No. PCT/US2019/043482 dated Feb. 11, 2021 (9 pages).

(Continued)

*Primary Examiner* — Luke D Ratcliffe
(74) *Attorney, Agent, or Firm* — Foley & Lardner LLP

(57) ABSTRACT

A method is presented for optimizing a scan pattern of a LIDAR system on an autonomous vehicle. The method includes receiving first SNR values based on values of a range of the target, where the first SNR values are for a respective scan rate. The method further includes receiving second SNR values based on values of the range of the target, where the second SNR values are for a respective integration time. The method further includes receiving a maximum design range of the target at each angle in the angle range. The method further includes determining, for each angle in the angle range, a maximum scan rate and a minimum integration time. The method further includes defining a scan pattern of the LIDAR system based on the (Continued)

maximum scan rate and the minimum integration time at each angle and operating the LIDAR system according to the scan pattern.

20 Claims, 21 Drawing Sheets

Related U.S. Application Data continuation of application No. PCT/US2019/043482, filed on Jul. 25, 2019.

(60) Provisional application No. 62/711,893, filed on Jul. 30, 2018.

(51) Int. Cl.
    *G01S 7/481* (2006.01)
    *G01S 7/4911* (2020.01)
    *G01S 7/4914* (2020.01)
    *G05D 1/02* (2020.01)
    *B60W 60/00* (2020.01)

(52) U.S. Cl.
    CPC .......... *G01S 7/4914* (2013.01); *G01S 17/931* (2020.01); *G05D 1/0231* (2013.01); *B60W 60/001* (2020.02); *B60W 2420/52* (2013.01)

(56) References Cited

U.S. PATENT DOCUMENTS

| | | |
|---|---|---|
| 5,371,581 A | 12/1994 | Wangler et al. |
| 2010/0053715 A1 | 3/2010 | O'Neill et al. |
| 2010/0277712 A1* | 11/2010 | Zaugg .................... G01S 17/02 |
| | | 356/5.01 |
| 2016/0327635 A1* | 11/2016 | Scheim ................. G01S 7/4815 |
| 2017/0150029 A1* | 5/2017 | Robertson .......... H04N 5/35554 |
| 2017/0299697 A1 | 10/2017 | Swanson |
| 2018/0113200 A1* | 4/2018 | Steinberg ................ G01S 17/10 |

FOREIGN PATENT DOCUMENTS

| | | |
|---|---|---|
| WO | WO-2018/160240 A2 | 9/2018 |
| WO | WO-2019/014177 A1 | 1/2019 |

OTHER PUBLICATIONS

International Search Report and Written Opinion on PCT/US2019/043482, dated Oct. 21, 2019, 10 pages.

Kachelmyer, "Range-Doppler Imaging with a Laser Radar," The Lincoln Laboratory Journal, 1990, vol. 3, No. 1, pp. 87-118.

* cited by examiner

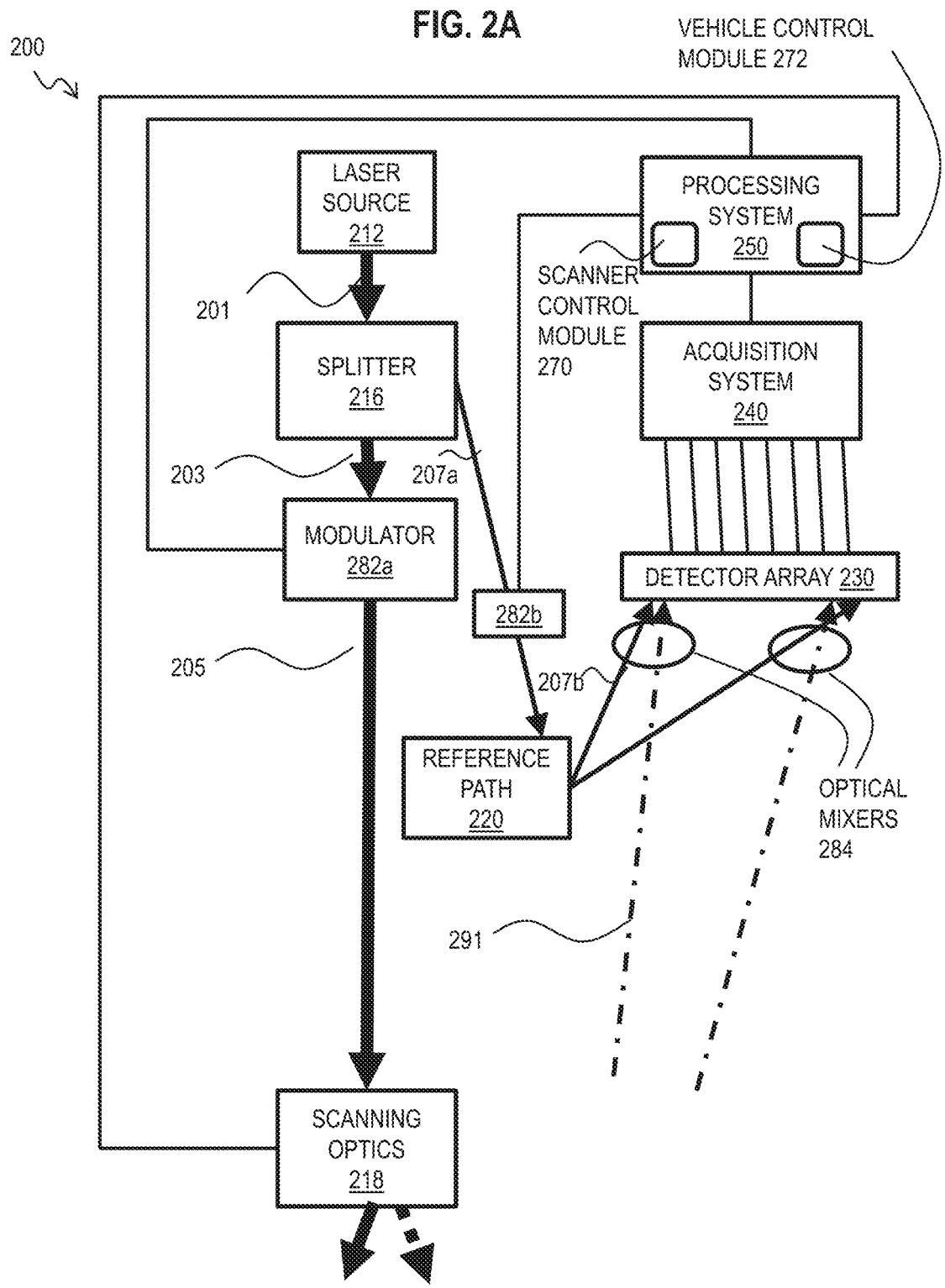

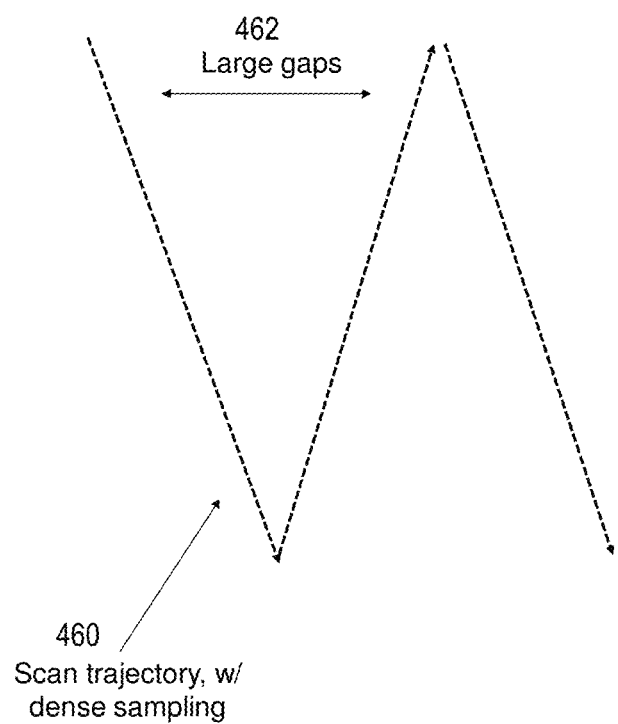

LIDAR SYSTEM FOR AUTONOMOUS VEHICLE

CROSS-REFERENCE TO RELATED APPLICATIONS

This application is a continuation of U.S. patent application Ser. No. 16/725,349, filed Dec. 23, 2019, which is a continuation of International Application No. PCT/US2019/043482 filed Jul. 25, 2019, which claims the benefit of and priority to U.S. Patent Application No. 62/711,893, filed Jul. 30, 2018. The entire disclosures of U.S. patent application Ser. No. 16/725,349, International Application No. PCT/US2019/043482, and U.S. Patent Application No. 62/711,893 are hereby incorporated by reference as if fully set forth herein.

BACKGROUND

Optical detection of range using lasers, often referenced by a mnemonic, LIDAR, for light detection and ranging, also sometimes called laser RADAR (radio-wave detection and ranging), is used for a variety of applications, from altimetry, to imaging, to collision avoidance. LIDAR provides finer scale range resolution with smaller beam sizes than conventional microwave ranging systems, such as RADAR. Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long-range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work by current inventors, show a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO 2018/160240 and WO 2018/144853.

These improvements provide range, with or without target speed, in a pencil thin laser beam of proper frequency or phase content. When such beams are swept over a scene, information about the location and speed of surrounding objects can be obtained. This information is expected to be of value in control systems for autonomous vehicles, such as self driving, or driver assisted, automobiles.

SUMMARY

The sampling and processing that provides range accuracy and target speed accuracy involve integration of one or more laser signals of various durations, in a time interval called integration time. To cover a scene in a timely way involves repeating a measurement of sufficient accuracy (involving one or more signals often over one to tens of microseconds) often enough to sample a variety of angles (often on the order of thousands) around the autonomous vehicle to understand the environment around the vehicle before the vehicle advances too far into the space ahead of the vehicle (a distance on the order of one to tens of meters, often covered in a particular time on the order of one to a few seconds). The number of different angles that can be covered in the particular time (often called the cycle or sampling time) depends on the sampling rate. The current inventors have recognized that a tradeoff can be made between integration time for range and speed accuracy, sampling rate, and pattern of sampling different angles, with one or more LIDAR beams, to effectively determine the environment in the vicinity of an autonomous vehicle as the vehicle moves through that environment.

In a first set of embodiments, a method for optimizing a scan pattern of a LIDAR system on an autonomous vehicle includes receiving, on a processor, data that indicates first signal-to-noise ratio (SNR) values of a signal reflected by a target and detected by the LIDAR system based on values of a range of the target, where the first SNR values are for a respective value of a scan rate of the LIDAR system. The method further includes receiving, on the processor, data that indicates second SNR values of the signal based on values of the range of the target, where the second SNR values are for a respective value of an integration time of the LIDAR system. The method further includes receiving, on the processor, data that indicates a first angle and a second angle that defines an angle range of the scan pattern. The method further includes receiving, on the processor, data that indicates a maximum design range of the target at each angle in the angle range. The method further includes determining, for each angle in the angle range, a maximum scan rate of the LIDAR system based on a maximum value among of those scan rates where the first SNR value based on the maximum design range exceeds a minimum SNR threshold. The method further includes determining, for each angle in the angle range, a minimum integration time of the LIDAR system based on a minimum value among of those integration times where the second SNR value based on the maximum design range exceeds a minimum SNR threshold. The method further includes defining, with the processor, a scan pattern of the LIDAR system based on the maximum scan rate and the minimum integration time at each angle in the angle range. The method further includes operating the LIDAR system according to the scan pattern.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates example components of a high resolution (hi res) LIDAR system, according to an embodiment;

FIG. 4H is a graph that illustrates an example of a conventional scan trajectory of the beam in the system of FIG. 2D mounted on a moving vehicle, according to an embodiment;

DETAILED DESCRIPTION

Figure 1A:
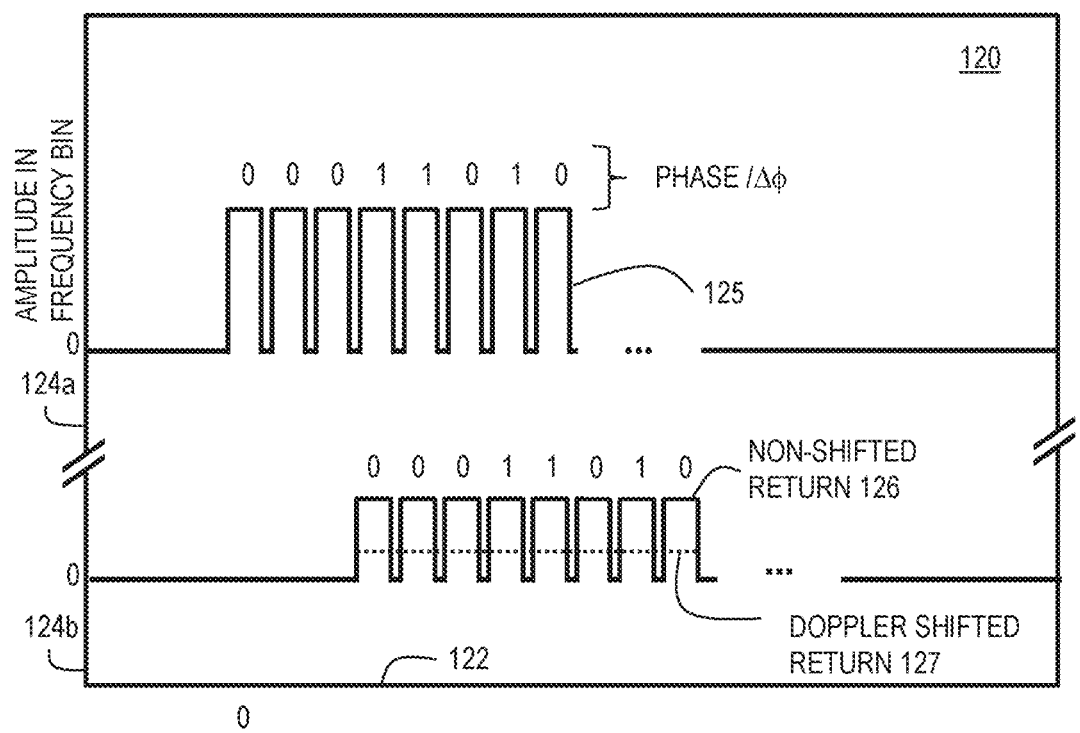
FIG. 1A is a schematic graph that illustrates an example transmitted signal of a series of binary digits along with returned optical signals for measurement of range, according to an embodiment.

A method and apparatus and system and computer-readable medium are described for scanning of LIDAR to support operation of a vehicle. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a single front mounted hi-res Doppler LIDAR system on a personal automobile; but, embodiments are not limited to this context. In other embodiments, one or multiple systems of the same type or other high resolution LIDAR, with or without Doppler components, with overlapping or non-overlapping fields of view or one or more such systems mounted on smaller or larger land, sea, air or space vehicles, piloted or autonomous, are employed.

1. PHASE-ENCODED DETECTION OVERVIEW

Using an optical phase-encoded signal for measurement of range, the transmitted signal is in phase with a carrier (phase=0) for part of the transmitted signal and then changes by one or more phase changes represented by the symbol $\Delta\phi$ (so phase=0, $\Delta\phi$, $2\Delta\phi$ . . . ) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi*\{0, 1, 2 \text{ and } 3\}$, which, for $\Delta\phi=\pi/2$ (90 degrees), equals $\{0, \pi/2, \pi \text{ and } 3\pi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

For optical ranging applications, since the transmitter and receiver are in the same device, coherent PSK can be used. The carrier frequency is an optical frequency fc and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus, a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency fc+$f_0$ in arbitrary units relative to zero. The vertical axis 124b indicates amplitude of an optical returned signal at frequency fc+$f_0$ in arbitrary units relative to zero; and, is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency fc+$f_0$ and is not well detected in the expected frequency band, so the amplitude is diminished.

The observed frequency f' of the return differs from the correct frequency f=fc+$f_0$ of the return by the Doppler effect given by Equation 1.

$$f' = \frac{(c + v_o)}{(c + v_s)} f \quad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[\frac{(c+v_o)}{(c+v_s)} - 1\right] f \quad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the Doppler shift is on the order of 16 megahertz (MHz, 1 MHz=$10^6$ hertz, Hz, 1 Hz=1 cycle per second). In various embodiments described below, the Doppler shift is detected and used to process the data for the calculation of range.

In phase coded ranging, the arrival of the phase coded return is detected in the return signal by cross correlating the transmitted signal or other reference signal with the returned signal, implemented practically by cross correlating the code for a RF signal with a electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c * \Delta t / 2 \quad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined; and, range R is not as readily produced.

Figure 1B:
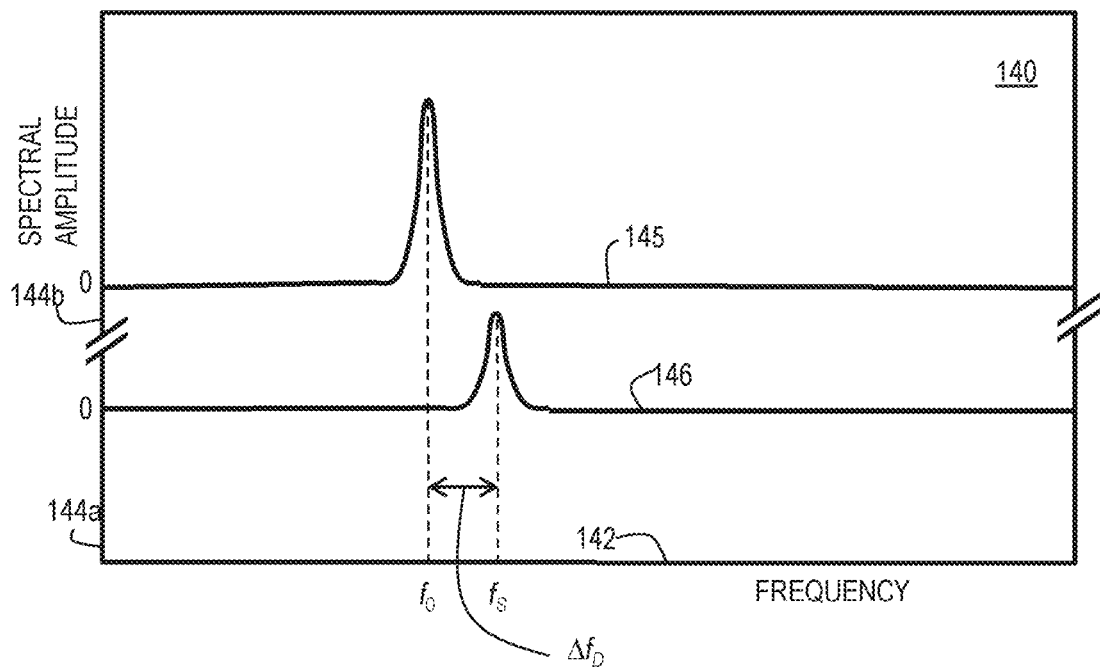
FIG. 1B is a schematic graph that illustrates an example spectrum of the reference signal and an example spectrum of a Doppler shifted return signal, according to an embodiment.

According to various embodiments of the inventor's previous work, the Doppler shift is determined in the electrical processing of the returned signal; and the Doppler shift is used to correct the cross-correlation calculation. Thus, a peak is more readily found; and, range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero, and is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF $f_0$; but, instead, is blue shifted by $\Delta f_D$ to a shifted frequency $f_S$. In practice, a complex return representing both in-phase and quadrature (I/Q) components of the return is used to determine the peak at $+\Delta f_D$, thus the direction of the Doppler shift, and the direction of motion of the target on the vector between the sensor and the object, is apparent from a single return.

Figure 1C:
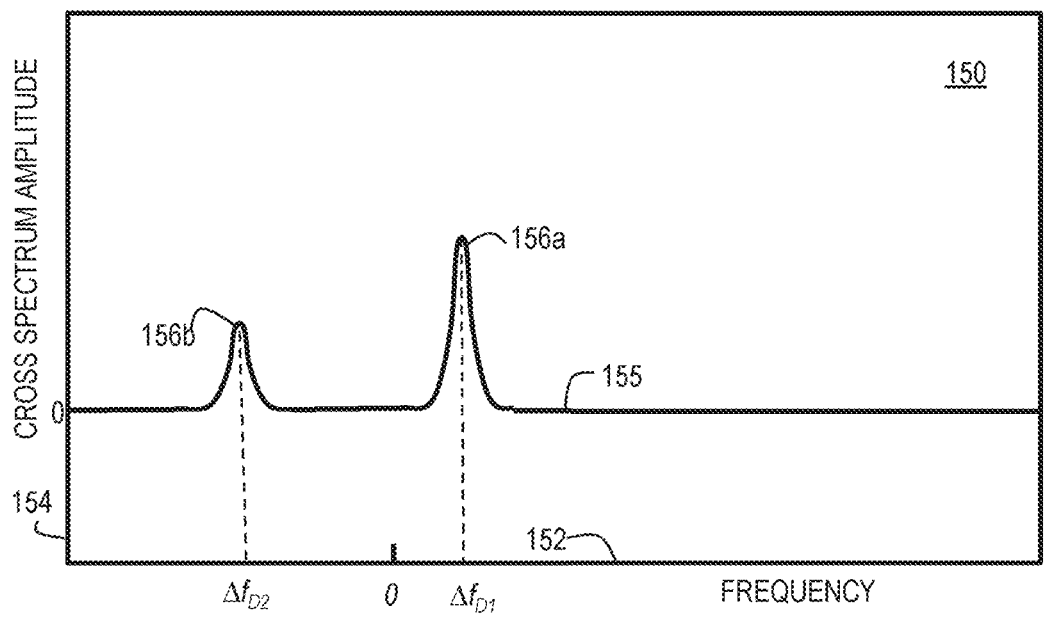
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it is more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1B) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus, the Doppler shifts are determined. These shifts can be used to determine a signed velocity of approach of objects in the vicinity of the LIDAR, as can be critical for collision avoidance applications. However, if I/Q processing is not done, peaks appear at both $+/-\Delta f_{D1}$ and both $+/-\Delta f_{D2}$, so there is ambiguity on the sign of the Doppler shift and thus the direction of movement.

As described in more detail in inventor's previous work the Doppler shift(s) detected in the cross spectrum are used to correct the cross correlation so that the peak 135 is apparent in the Doppler compensated Doppler shifted return at lag $\Delta t$, and range R can be determined. In some embodiments simultaneous I/Q processing is performed as described in more detail in World Intellectual Property Organization publication WO 2018/144853 entitled "Method and system for Doppler detection and Doppler correction of optical phase-encoded range detection", the entire contents of which are hereby incorporated by reference as if fully set forth herein. In other embodiments, serial I/Q processing is used to determine the sign of the Doppler return as described in more detail in World Intellectual Property Organization publication WO 2019/014177 entitled "Method and System for Time Separated Quadrature Detection of Doppler Effects in Optical Range Measurements", the entire contents of which are herby incorporated by reference as if fully set forth herein. In other embodiments, other means are used to determine the Doppler correction; and, in various embodiments, any method known in the art to perform Doppler correction is used. In some embodiments, errors due to Doppler shifting are tolerated or ignored; and, no Doppler correction is applied to the range measurements.

2. CHIRPED DETECTION OVERVIEW

Figure 1D:
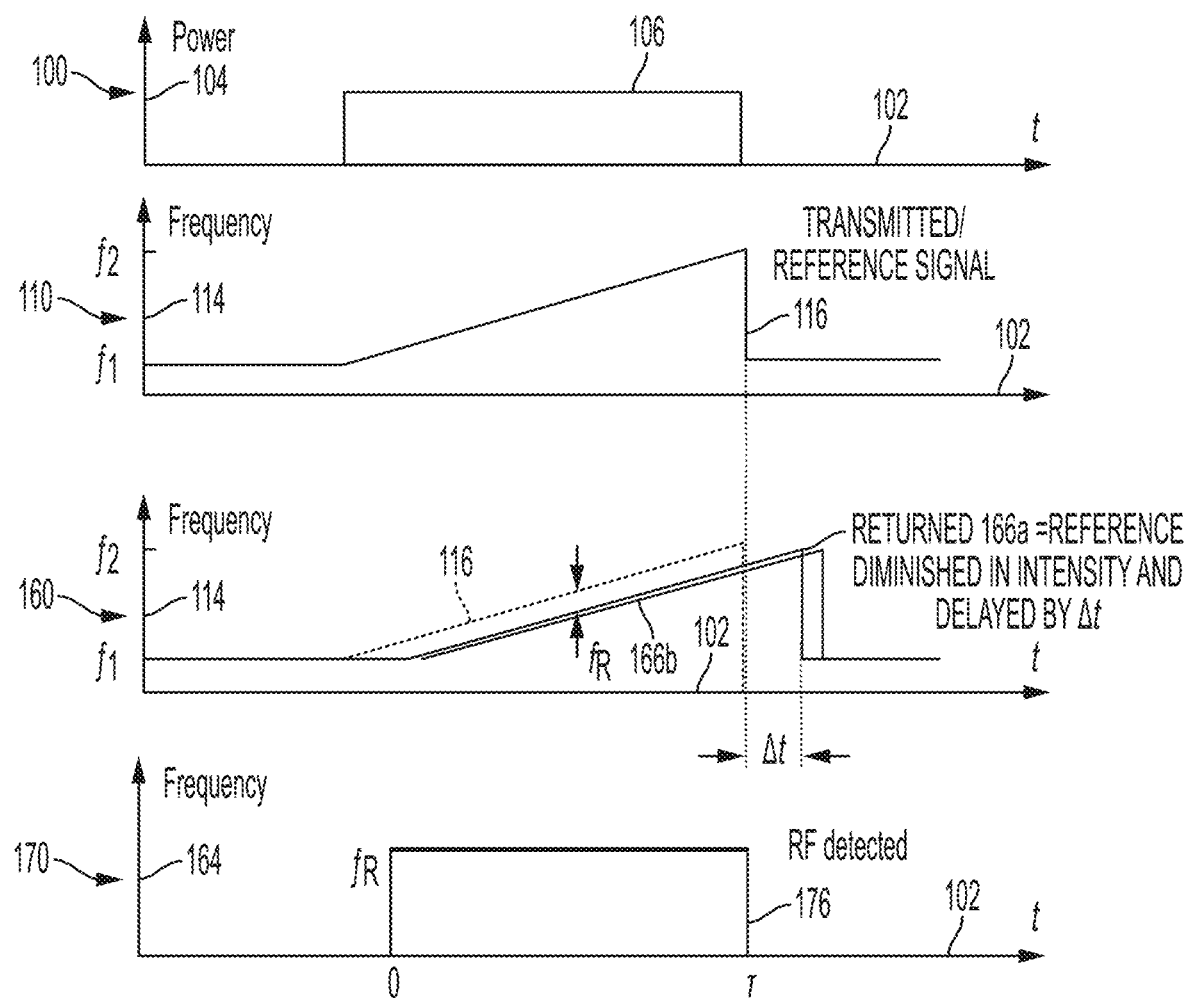
FIG. 1D is a set of graphs that illustrates an example optical chirp measurement of range, according to an embodiment.

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, τ starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration τ of the pulse, and thus has a bandwidth $B=f_2-f_1$. The frequency rate of change is $(f_2-f_1)/\tau$.

The returned signal is depicted in graph 160 which has a horizontal axis 102 that indicates time and a vertical axis 114 that indicates frequency as in graph 110. The chirp 116 of graph 110 is also plotted as a dotted line on graph 160. A first returned signal is given by trace 166a, which is just the transmitted reference signal diminished in intensity (not shown) and delayed by Δt. When the returned signal is received from an external object after covering a distance of 2R, where R is the range to the target, the returned signal start at the delayed time Δt is given by 2R/c, where c is the speed of light in the medium (approximately 3×$10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R=(f_2-f_1)/\tau*2R/c=2BR/c\tau \quad (4a)$$

The value of $f_R$ is measured by the frequency difference between the transmitted signal 116 and returned signal 166a in a time domain mixing operation referred to as de-chirping. So the range R is given by Equation 4b.

$$R=f_R c\tau/2B \quad (4b)$$

Of course, if the returned signal arrives after the pulse is completely transmitted, that is, if 2R/c is greater than τ, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot (pencil beam cross section) illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value off that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much-expanded scale. Trace 176 depicts the constant frequency $f_R$ measured in response to the transmitted chirp, which indicates a particular range as given by Equation 4b. The second returned signal 166b, if present, would give rise to a different, larger value off (not shown) during de-chirping; and, as a consequence yield a larger range using Equation 4b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 1E:
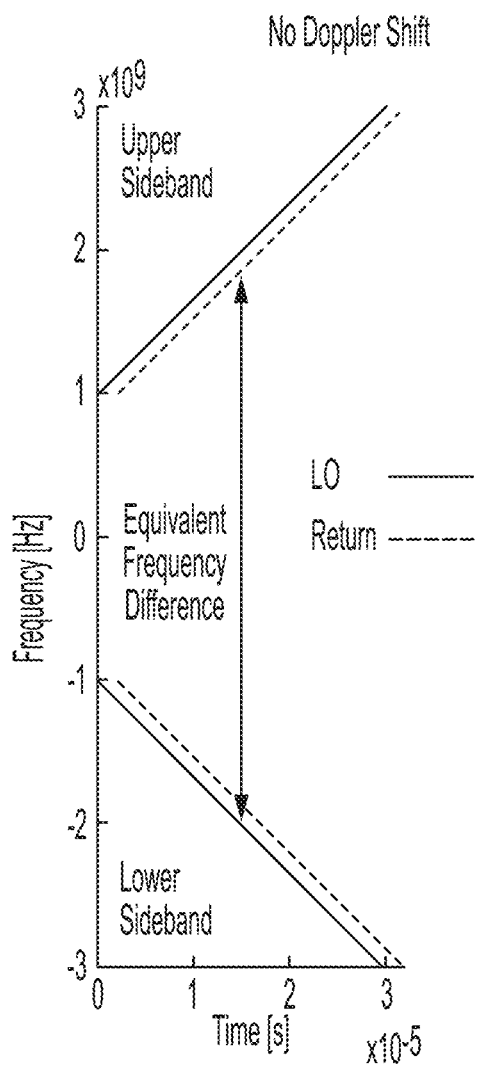
FIG. 1E is a graph using a symmetric LO signal, and shows the return signal in this frequency time plot as a dashed line when there is no Doppler shift, according to an embodiment.

FIG. 1E is a graph using a symmetric LO signal; and shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency fc or reference signal in example units of gigaHertz (GHz, 1 GHz=$10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneous decreases from $f_4$ to $f_3$ (e.g., 1 to 2 GHz below the optical carrier) The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1<f_2<f_p<f_3<f_4$. Though, in the illustrated embodiment, the higher frequencies provide the up chirp and the lower frequencies provide the down chirp, in other embodiments, the higher frequencies produce the down chirp and the lower frequencies produce the up chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

As described in World Intellectual Property Organization publication WO 2018/160240 entitled "Method and System for Doppler Detection and Doppler Correction of Optical Chirped Range Detection," the entire contents of which are hereby incorporated by reference as if fully set forth herein, when selecting the transmit (TX) and local oscillator (LO) chirp waveforms, it is advantageous to ensure that the frequency shifted bands of the system take maximum advantage of available digitizer bandwidth. In general, this is accomplished by shifting either the up chirp or the down chirp to have a range frequency beat close to zero.

Figure 1F:
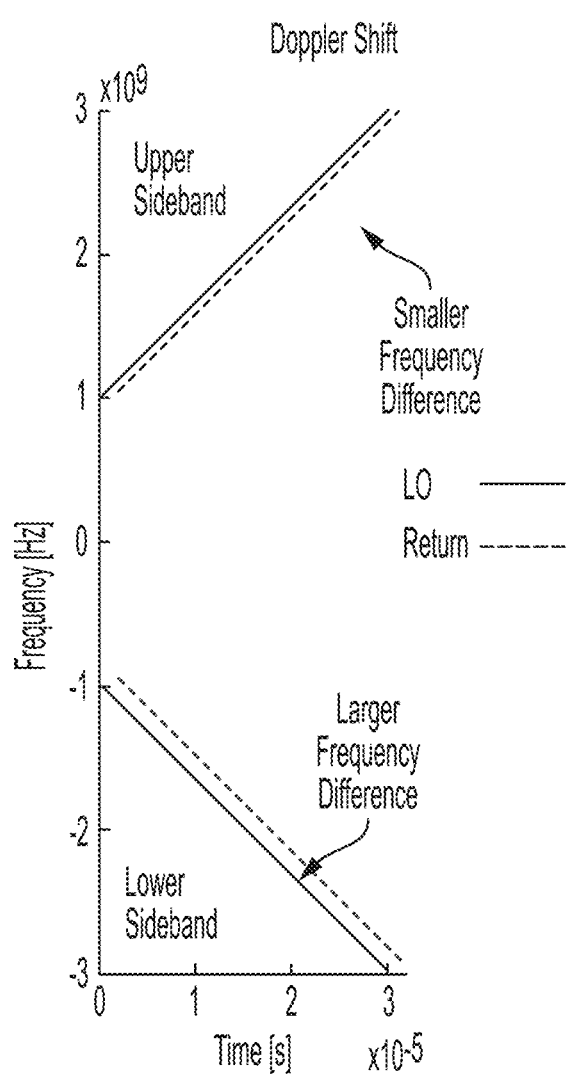
FIG. 1F is a graph similar to FIG. 1E, using a symmetric LO signal, and shows the return signal in this frequency time plot as a dashed line when there is a nonzero Doppler shift, according to an embodiment.

FIG. 1F is a graph similar to FIG. 1E, using a symmetric LO signal, and shows the return signal in this frequency time plot as a dashed line when there is a non-zero Doppler shift. For example, if the blue shift causing range effects is $f_B$, then the beat frequency of the up chirp will be increased by the offset and occur at $f_B+\Delta f_S$ and the beat frequency of the down chirp will be decreased by the offset to $f_B-\Delta f_S$. Thus, the up chirps will be in a higher frequency band than the down chirps, thereby separating them. If $\Delta f_S$ is greater than any expected Doppler effect, there will be no ambiguity in the ranges associated with up chirps and down chirps. The measured beats can then be corrected with the correctly signed value of the known $\Delta f_S$ to get the proper up-chirp and down-chirp ranges In the case of a chirped waveform, the time separated I/Q processing (aka time domain multiplexing) can be used to overcome hardware requirements of other approaches as described above. In that case, an AOM is used to break the range-Doppler ambiguity for real valued signals. In some embodiments, a scoring system is used to pair the up and down chirp returns as described in more detail in the above cited publication. In other embodiments, I/Q processing is used to determine the sign of the Doppler chirp as described in more detail above.

3. OPTICAL DETECTION HARDWARE OVERVIEW

In order to depict how to use hi-res range-Doppler detection systems, some generic hardware approaches are described. FIG. 2A is a block diagram that illustrates example components of a high-resolution range LIDAR system 200, according to an embodiment. Optical signals are indicated by arrows. Electronic wired or wireless connections are indicated by segmented lines without arrowheads. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a one-dimensional (1D) or two-dimensional (2D) array of paired or unpaired detectors arranged in a plane roughly perpendicular to returned beams 291 from the object. The reference beam 207b and returned beam 291 are combined in zero or more optical mixers 284 to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration or integration time affects the down-range extent. The number or integration time is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218, according to one or more of the embodiments described below. In one embodiment, the scanner control module 270 includes instructions to perform one or more steps of the method 600 described below with reference to the flowchart of FIG. 6. A signed Doppler compensation module (not shown) in processing system 250 determines the sign and size of the Doppler shift and the corrected range based thereon along with any other corrections. The processing system 250 also includes a modulation signal module (not shown) to send one or more electrical signals that drive modulators 282a, 282b. In some embodiments, the processing system also includes a vehicle control module 272 to control a vehicle on which the system 200 is installed.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount $\Delta f_S$, so that the beat frequencies of the up and down chirps occur in different frequency bands, which can be picked up, e.g., by the FFT component in processing system 250, in the analysis of the electrical signal output by the optical detector 230. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources. In some embodiments, the modulator 282a is excluded (e.g. in direct ranging embodiments).

Figure 2B:
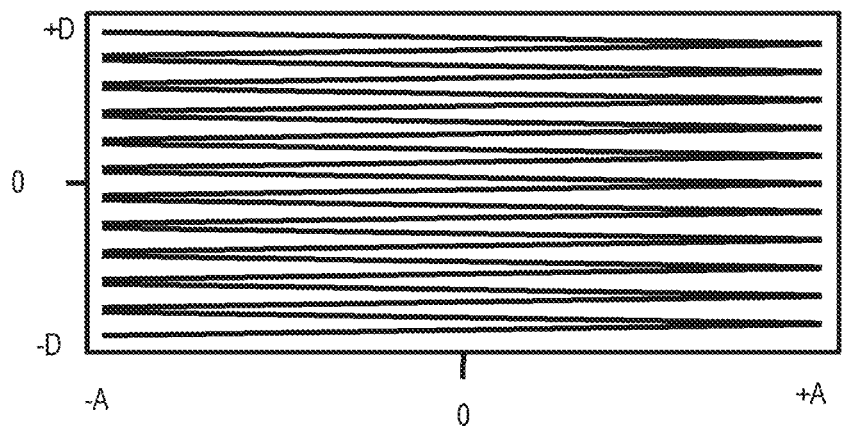
FIG. 2B is a block diagram that illustrates a saw tooth scan pattern for a hi-res Doppler system, used in some embodiments.

FIG. 2B is a block diagram that illustrates a simple saw tooth scan pattern for a hi-res Doppler system, used in some prior art embodiments. The scan sweeps through a range of azimuth angles (horizontally) and inclination angles (vertically above and below a level direction at zero inclination).

Figure 2C:
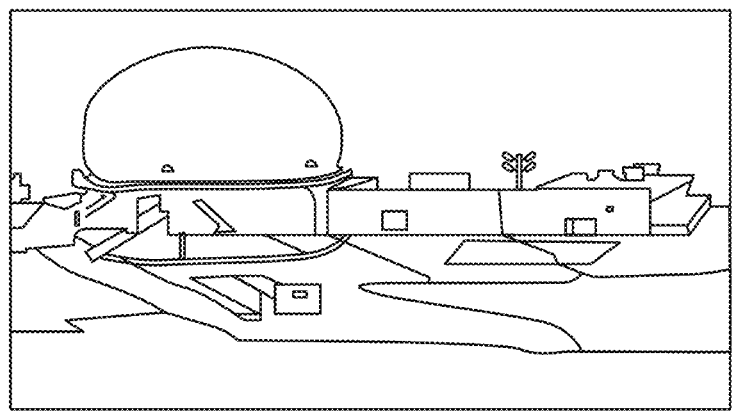
FIG. 2C is an image that illustrates an example speed point cloud produced by a hi-res Doppler LIDAR system, according to an embodiment.

In various embodiments described below, other scan patterns are used. Any scan pattern known in the art may be used in various embodiments. For example, in some embodiments, adaptive scanning is performed using methods described in World Intellectual Property Organization publications WO 2018/125438 and WO 2018/102188 the entire contents of each of which are hereby incorporated by reference as if fully set forth herein. FIG. 2C is an image that illustrates an example speed point cloud produced by a hi-res Doppler LIDAR system, according to an embodiment. Each pixel in the image represents a point in the point cloud which indicates range or intensity or relative speed or some combination at the inclination angle and azimuth angle associated with the pixel.

Figure 2D:
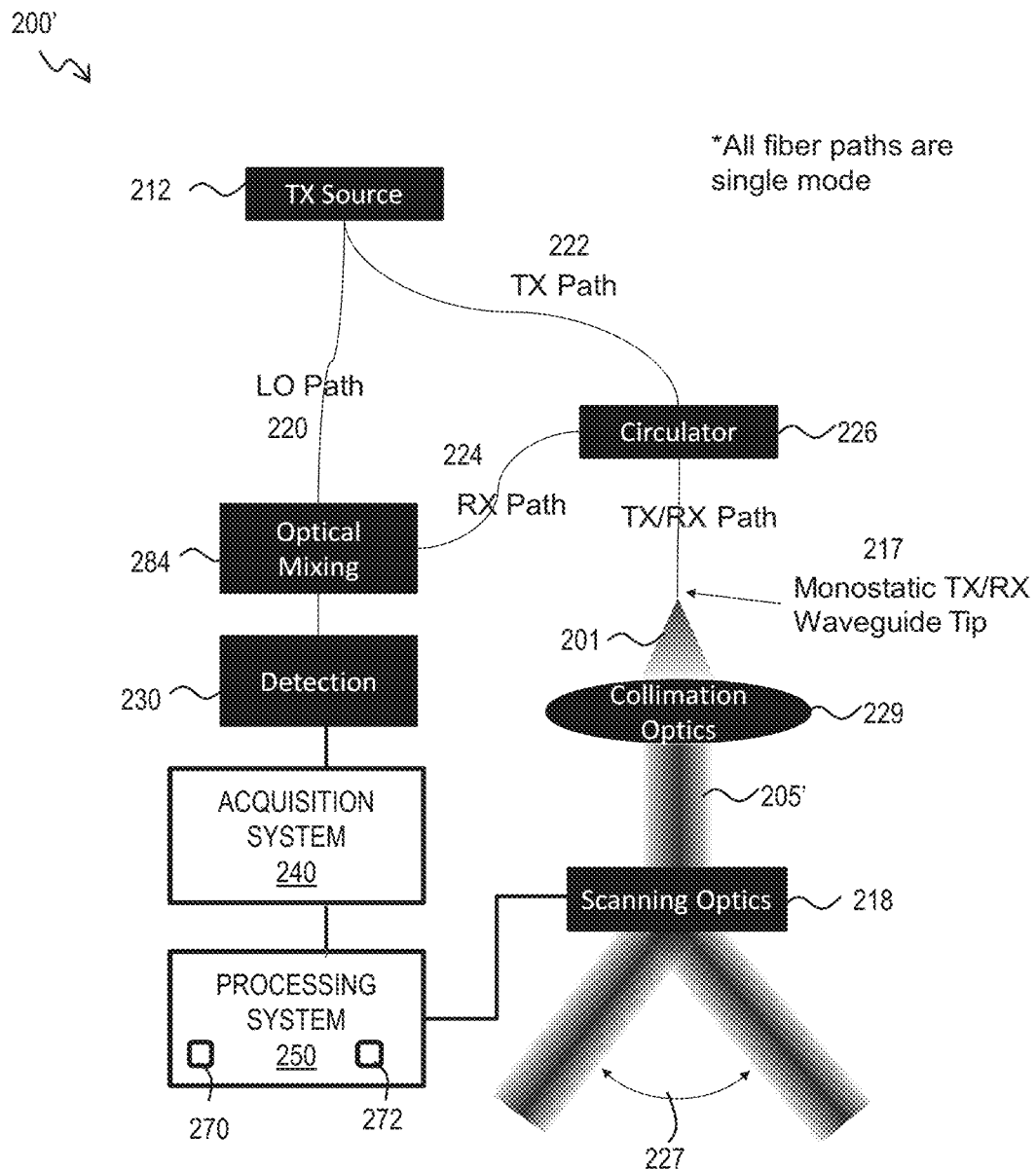
FIG. 2D is a block diagram that illustrates example components of a high resolution (hi res) LIDAR system, according to an embodiment.

FIG. 2D is a block diagram that illustrates example components of a high-resolution (hi-res) LIDAR system 200', according to an embodiment. In this embodiment, the system 200' is similar to the system 200 with the exception of the features discussed herein. In an embodiment, the system 200' is a coherent LIDAR system that is constructed with monostatic transceivers. The system 200' includes the source 212 that transmits the carrier wave 201 along a single-mode optical waveguide over a transmission path 222, through a circulator 226 and out a tip 217 of the single-mode optical waveguide that is positioned in a focal plane of a collimating optic 219. In an embodiment, the tip 217 is positioned within a threshold distance (e.g. about 100 μm) of the focal plane of the collimating optic 219 or within a range from about 0.1% to about 0.5% of the focal length of the collimating optic 219. In another embodiment, the collimating optic 219 includes one or more of doublets, aspheres or multi-element designs. In an embodiment, the carrier wave 201 exiting the optical waveguide tip 217 is shaped by the optic 229 into a collimated target beam 205' which is scanned over a range of angles 227 by scanning optics 218. In some embodiments, the carrier wave 201 is phase or frequency modulated in a modulator 282a upstream of the collimation optic 229. In other embodiments, modulator 282 is excluded. In an embodiment, return beams 291 from an object are directed by the scanning optics 218 and focused by the collimation optics 229 onto the tip 217 so that the return beam 291 is received in the single-mode optical waveguide tip 217. In an embodiment, the return beam 291 is then redirected by the circulator 226 into a single mode optical waveguide along the receive path 224 and to optical mixers 284 where the return beam 291 is combined with the reference beam 207b that is directed through a single-mode optical waveguide along a local oscillator path 220. In one embodiment, the system 200' operates under the principal that maximum spatial mode overlap of the returned beam 291 with the reference signal 207b will maximize heterodyne mixing (optical interference) efficiency between the returned signal 291 and the local oscillator 207b. This arrangement is advantageous as it can help to avoid challenging alignment procedures associated with bi-static LIDAR systems.

4. MONOSTATIC COHERENT LIDAR SYSTEM PARAMETERS

In an embodiment, monostatic coherent LIDAR performance of the system 200' is modeled by including system parameters in a so called "link budget" and a LIDAR is operated based on that modeling. A link budget estimates the expected value of the signal to noise ratio (SNR) for various system and target parameters. In one embodiment, on the system side, a link budget includes one or more of output optical power, integration time, detector characteristics, insertion losses in waveguide connections, mode overlap between the imaged spot and the monostatic collection waveguide, and optical transceiver characteristics. In another embodiment, on the target side, a link budget includes one or more of atmospheric characteristics, target reflectivity, and target range.

Figure 4A:
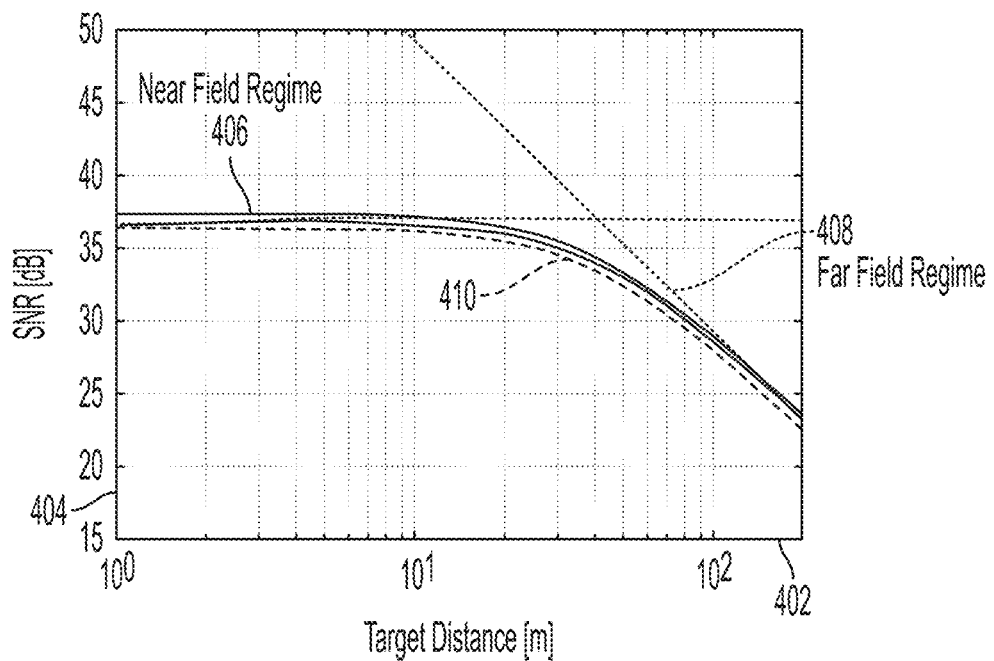
FIG. 4A is a graph that illustrates an example signal-to-noise ratio (SNR) versus target range for the transmitted signal in the system of FIG. 2D without scanning, according to an embodiment.
Figure 4B:
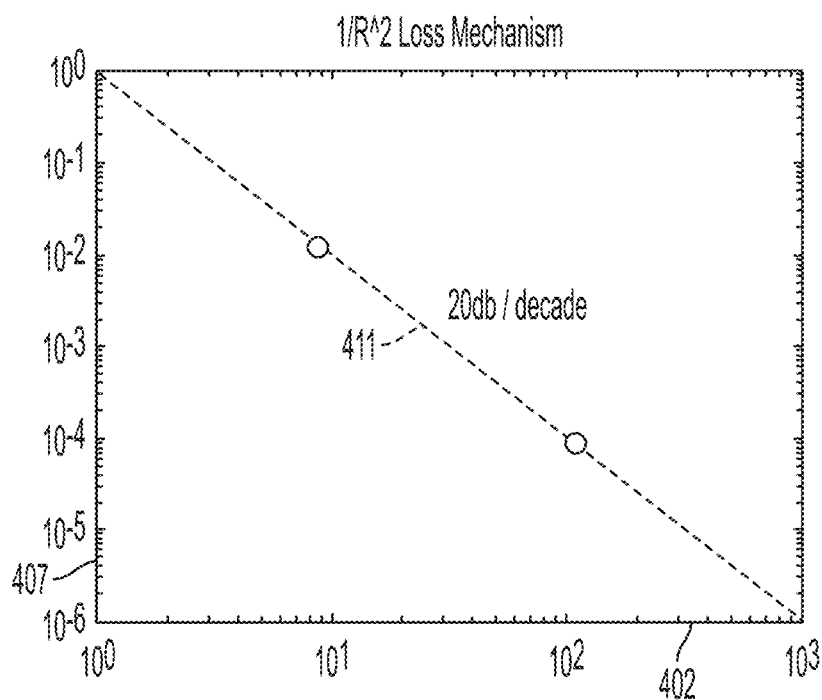
FIG. 4B is a graph that illustrates an example of a curve indicating a $1/R^2$ loss that drives the shape of the SNR curve of FIG. 4A in the far field, according to an embodiment.

FIG. 4A is a graph that illustrates an example signal-to-noise ratio (SNR) versus target range for the return beam 291 in a LIDAR system without scanning, such as the system 200' of FIG. 2D or the system 200 of FIG. 2A. The horizontal axis 402 is target range in units of meters (m). The vertical axis 404 is SNR in units of decibels (dB). A trace 410 depicts the values of SNR versus range that is divided into a near field 406 and a far field 408 with a transition from the near field 406 of the curve 410 with a relatively flat slope to the far field 408 of the curve 410 with a near constant negative slope (e.g. about −20 dB per 10 m). The reduction in SNR in the far field 408 is dominated by "r-squared" losses, since the scattering atmosphere through which the return beam 291 passes grows with the square of the range to the target while the surface area of the optical waveguide tip 217 to collect the return beam 291 is fixed. FIG. 4B is a graph that illustrates an example of a trace 411 indicating $1/R^2$ loss that drives the shape of the SNR curve 410 in the far field 408, according to an embodiment. The horizontal axis 402 is range in units of meters (m) and the vertical axis 407 indicate power loss that is unitless on a logarithmic scale.

Figure 4C:
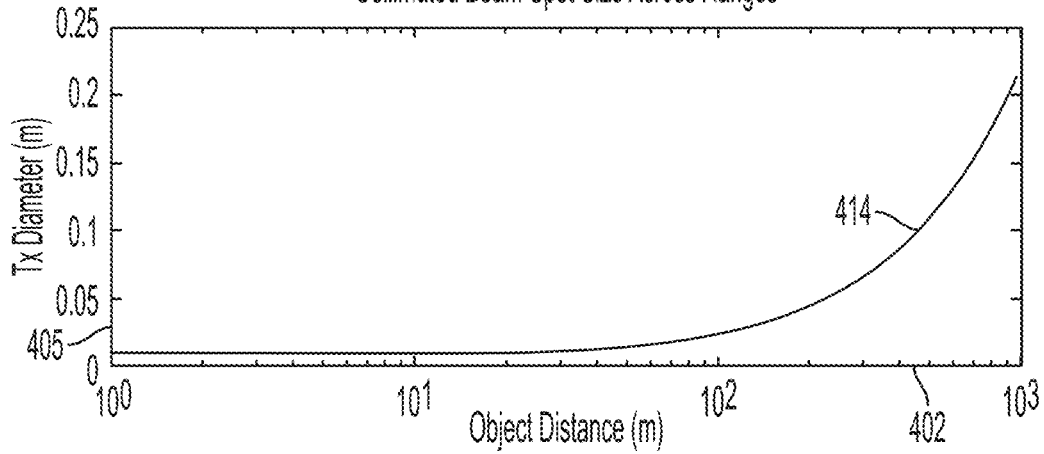
FIG. 4C is a graph that illustrates an example of collimated beam diameter versus range for the transmitted signal in the system of FIG. 2D without scanning, according to an embodiment.

In the near field 406, a primary driver of the SNR is a diameter of the collimated return beam 291 before it is focused by the collimation optics 229 to the tip 217. FIG. 4C is a graph that illustrates an example of collimated beam diameter versus range for the return beam 291 in the system 200' of FIG. 2D without scanning, according to an embodiment. The horizontal axis 402 indicates target range in units of meters (m) and the vertical axis 405 indicates diameter of the return beam 291 in units of meters (m). In an embodiment, curve 414 depicts the diameter of the collimated return beam 291 incident on the collimation optics 229 prior to the return beam 291 being focused to the tip 217 of the optical waveguide. The trace 414 illustrates that the diameter of the collimated return beam 291 incident on the collimation optics 229 increases with increasing target range.

Figure 4D:
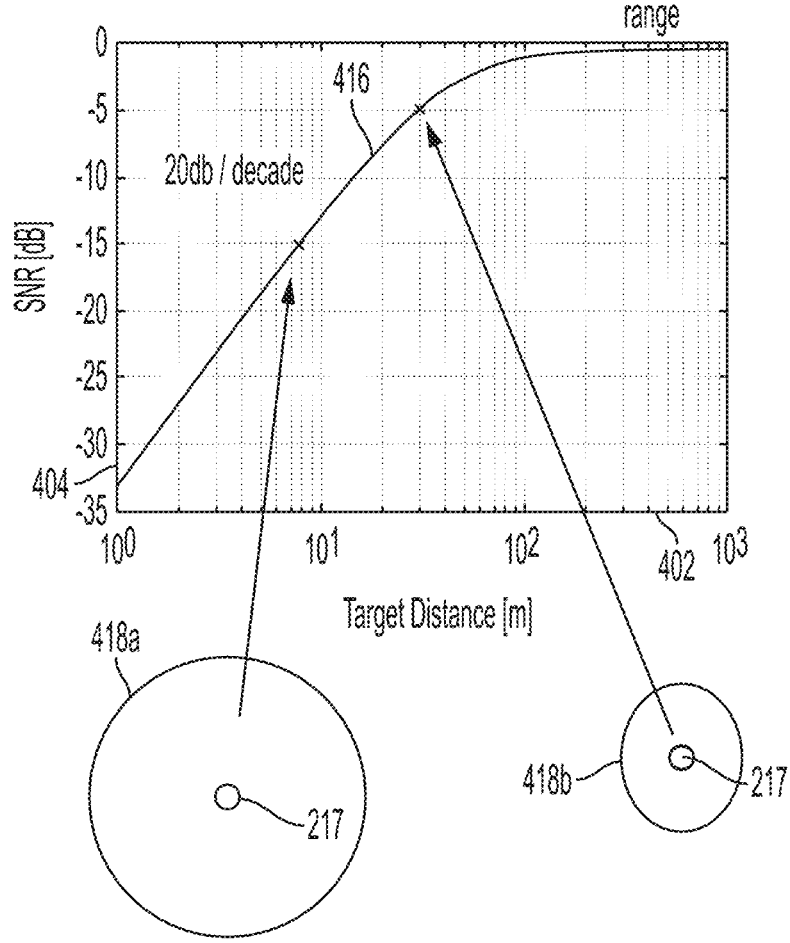
FIG. 4D is a graph that illustrates an example of SNR associated with collection efficiency versus range for the transmitted signal in the system of FIG. 2D without scanning, according to an embodiment.

In an embodiment, in the near field 406, as the diameter of the collimated return beam 291 grows at larger target ranges, a diameter of the focused return beam 291 by the collimation optics 229 at the tip 217 shrinks. FIG. 4D is a graph that illustrates an example of SNR associated with collection efficiency of the return beam 291 at the tip 217 versus range for the transmitted signal in the system of FIG. 2D without scanning, according to an embodiment. The horizontal axis 402 indicates target range in units of meters (m) and the vertical axis 404 indicates SNR in units of decibels (dB). The trace 416 depicts the near field SNR of the focused return beam 291 by the collimation optics 229 at the tip 217 based on target range. At close ranges within the near field 406, an image 418a of the focused return beam 291 at the tip 217 by the collimation optics 229 is sufficiently larger than the core size of the single mode optical fiber tip 217. Thus, the tip receives less of the returned signal; and, the SNR associated with the collection efficiency is relatively low. At longer ranges within the near field 406, an image 418b of the focused return beam 291 at the tip 217 by the collimation optics 229 is much smaller than the image 418a and thus the SNR attributable to the collection efficiency increases at longer ranges. In an embodiment, the curve 416 demonstrates that the SNR in near field 406 has a positive slope (e.g. +20 dB per 10 meters) based on the improved collection efficiency of the focused return beam 291 at longer ranges. In one embodiment, this positive slope in the near field SNR cancels the negative slope in the near field SNR discussed in FIG. 4B that is attributable to "r-squared" losses and thus leads to the relatively flat region of the SNR curve 410 in the near field 406. The positive slope in the SNR curve 416 in FIG. 4D does not extend into the far field 408 and thus the "r-squared" losses of FIG. 4B dominate the far field 408 SNR as depicted in the SNR curve 410 in the far field 408.

Figure 4E:
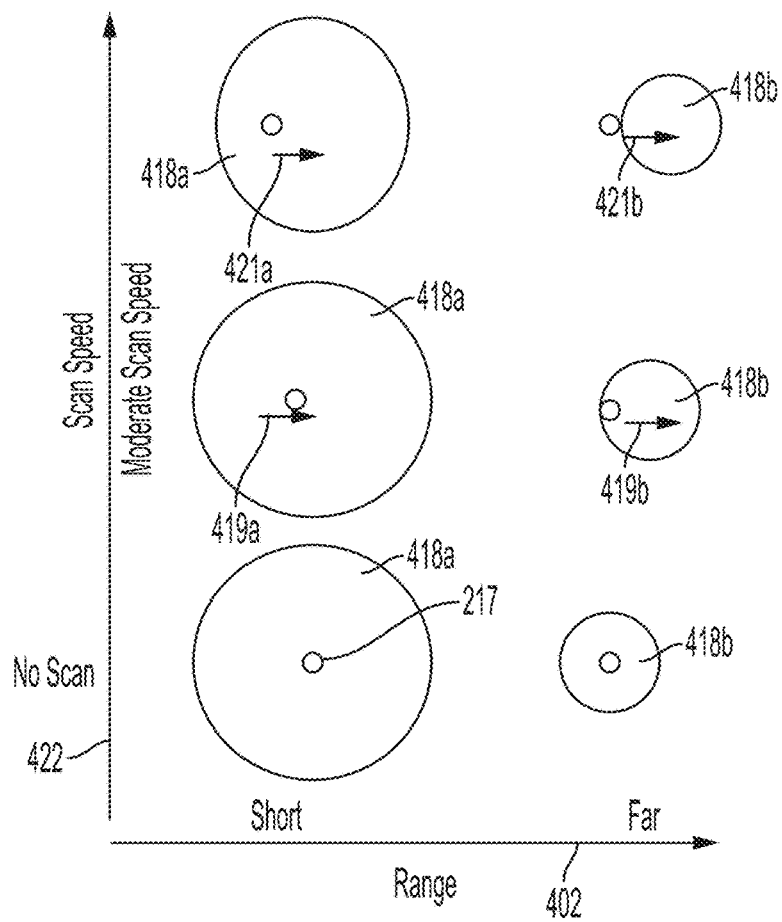
FIG. 4E is an image that illustrates an example of beam walkoff for various target ranges and scan speeds in the system of FIG. 2D, according to an embodiment.

While the discussion in relation to FIGS. 4A-4D predicts SNR of the return beam 291 as a function of the target range, the predicted SNR in FIGS. 4A-4D does not fully characterize the performance of the scanned monostatic coherent LIDAR system 200' since it does not consider a scan rate of the scanning optics 218. In an embodiment, due to round trip delay of the return beam 291, the receive mode of the return beam 291 will laterally shift or "walk off" from the transmitted mode of the transmitted beam 205' when the beam is being scanned by the scanning optics 218. FIG. 4E is an image that illustrates an example of beam walkoff for various target ranges and scan speeds in the system 200' of FIG. 2D, according to an embodiment. The horizontal axis 402 indicates target range and the vertical axis 422 indicates scan speed of the beam using the scanning optics 218. As FIG. 4E depicts, there is no beam walkoff when the beam is not scanned (bottom row) since the image 418a of the focused return beam 291 is centered on the fiber tip 217 demonstrating no beam walkoff at short target range; and the image 418b of the focused return beam 291 is also centered on the fiber tip 217 demonstrating no beam walkoff at far target range. When the beam is scanned at a moderate scan speed (middle row in FIG. 4E), a moderate beam walkoff 419a is observed between the image 418a of the focused return beam 291 and the fiber tip 217 and a larger beam walkoff 419b is observed between the image 418b of the focused return beam 291 and the fiber tip 217. The loss of intensity is relative less in the near field and relatively more in the far field. When the beam is scanned at a high scan speed (top row in FIG. 4E), a beam walkoff 421a is observed at short range that exceeds the beam walkoff 419a at the moderate scan speed; and a beam walkoff 421b is observed at large range that exceeds the beam walk off 419b at the moderate scan speed. Thus, the beam walkoff increases as the target range and scan speed increase. In an embodiment, increased target range induces a time delay during which the image 418a, 418b shifts away from the tip 217 of the fiber core. Thus, a model of the mode overlap accounts for this walkoff appropriately, and operation of the LIDAR is adapted to account for this effect. In one embodiment, such operation should limit the beam walkoff 419 based on a diameter of the image 418 (e.g., no greater than half of the diameter of the image 418).

Figure 4F:
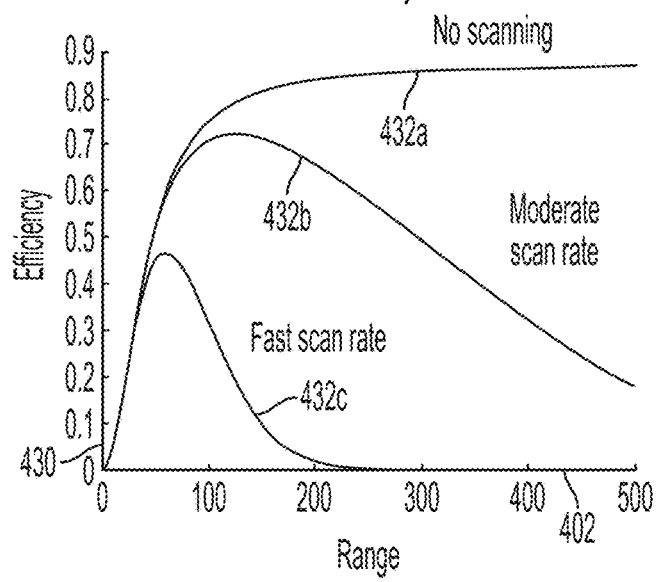
FIG. 4F is a graph that illustrates an example of coupling efficiency versus target range for various scan rates in the system of FIG. 2D, according to an embodiment.

FIG. 4F is a graph that illustrates an example of coupling efficiency versus target range for various scan rates in the system 200' of FIG. 2D, according to an embodiment. The horizontal axis 402 indicates target range in units of meters (m) and the vertical axis 430 indicates coupling efficiency which is unitless. In the illustrated embodiment, the coupling efficiency is inversely proportional to the beam walkoff 419. A first trace 432a depicts the coupling efficiency of the focused return beam 291 into the fiber tip 217 for various target ranges based on no scanning of the beam. The coupling efficiency remains relatively high and constant for a wide range of target ranges. A second trace 432b depicts the coupling efficiency of the focused return beam 291 into the fiber tip 217 for various target ranges based on moderate scan rate of the beam. In this embodiment, the coupling efficiency at the moderate scan rate peaks at a moderate target range (e.g. about 120 m) and then decreases as target range increases. A third trace 432c depicts the coupling efficiency of the focused return beam 291 into the fiber tip 217 for various target ranges based on a high scan rate of the beam. In this embodiment, the coupling efficiency of the high scan rate peaks at a low target range (e.g. about 80 m) and then decreases as target range increases.

Figure 4G:
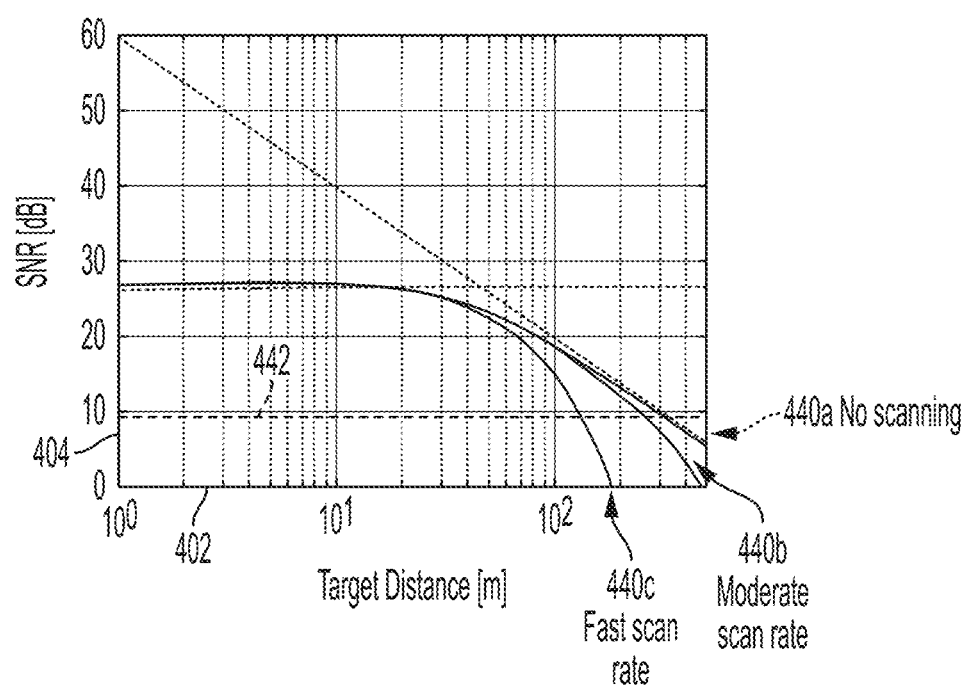
FIG. 4G is a graph that illustrates an example of SNR versus target range for various scan rates in the system of FIG. 2D, according to an embodiment.

Based on the traces in FIG. 4F, scanning too fast will eventually make it impossible to see beyond some target range. In this instance, the image 418b of the focused return beam 291 does not couple into the fiber tip 217 and instead has totally walked off the receiver mode of the tip 217. FIG. 4G is a graph that illustrates an example of SNR versus target range for various scan rates in the system 200' of FIG. 2D, according to an embodiment. The horizontal axis 402 indicates target range in units of meters (m) and the vertical axis 404 indicates SNR in units of decibels (dB). A first trace 440a depicts the SNR of the focused return beam 291 on the fiber tip 217 based on target range where the beam is not scanned. A second trace 440b depicts the SNR of the focused return beam 291 on the fiber tip 217 based on target range where the beam is scanned at a moderate scan rate. In an example embodiment, the moderate scan rate is about 2500 degrees per sec (deg/sec) or in a range from about 1000 deg/sec to about 4000 deg/sec or in a range from about 500 deg/sec to about 5000 deg/sec. A third trace 440c depicts the SNR of the focused return beam 291 on the fiber tip 217 based on target range where the beam is scanned at a high scan rate. In an example embodiment, the high scan rate is about 5500 deg/sec or in a range from about 4000 deg/sec to about 7000 deg/sec or in a range from about 3000 deg/sec to about 8000 deg/sec. In an embodiment, the moderate scan rate and high scan rate are based on a beam size and goal of the system. In an example embodiment, the numerical ranges of the moderate scan rate and high scan rate above are based on a collimated beam with a diameter of about 1 centimeter (cm) used to scan an image out to a maximum target range of about 200 meters (m).

Ultimately, beam walk off 419 is a significant inhibitor of SNR in coherent monostatic LIDAR system 200'. In conventional coherent monostatic LIDAR systems, the scan rate of the beam is set at a fixed scan rate over the angle range and the resulting target range, where the fixed scan rate is chosen so that the associated SNR of the fixed scan rate is above an SNR threshold for the entire target range of interest. In conventional coherent LIDAR systems, this results in a relatively low fixed scan rate being used to scan the beam over a scan trajectory 460, which results in large gaps 462 between adjacent scans, as depicted in FIG. 4H. The scan speed limitation leads to dense sampling along the beam trajectory 460. When the beam is scanned over a reasonably large field of few (e.g. 10's of degrees in either dimension), the beam trajectory 460 leaves large gaps 462 in the angular coverage. This is not ideal as some targets positioned in the large gaps 462 can go undetected. A "square grid" of rectangular sampling is not achieved. Instead, an asymmetry is observed between the sampling along the scan trajectory 460 and the gaps 462 between the trajectory 460, which can be greater than 10:1. With this problem in mind, the inventors of the various embodiments developed several complementary solutions including one or more of maximizing beam scan speed when possible, directly "step scan" the beam between discrete locations, and generate efficient hardware solutions for these concepts.

In addition to the scan rate of the beam, the SNR of the return beam 291 is affected by the integration time over which the acquisition system 240 and/or processing system 250 samples and processes the return beam 291. In some embodiments, the beam is scanned between discrete angles and is held stationary or almost stationary at discrete angles in the angle range 227 for a respective integration time at each discrete angle. The SNR of the return beam 291 is affected by the value of the integration time and the target range. As previously discussed, the cross-sectional area of the beam increases with target range resulting in increased atmospheric scattering and thus an intensity of the return beam 291 decreases with increasing range at the rate of $1/R^2$. Accordingly, a longer integration time is needed to achieve the same SNR for a return beam 291 from a longer target range.

Figure 4I:
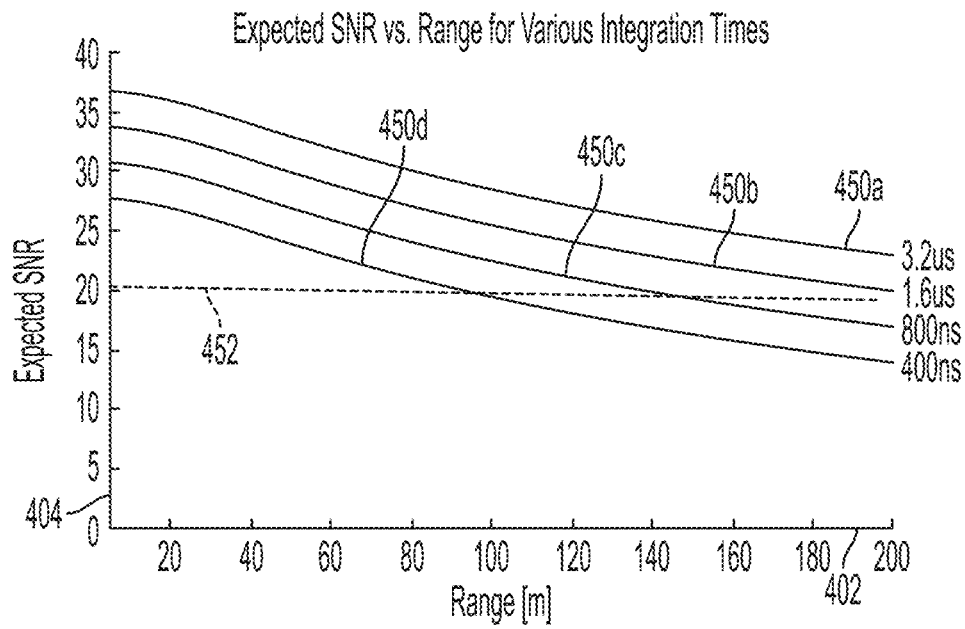
FIG. 4I is a graph that illustrates an example of SNR versus target range for various integration times in the system of FIG. 2D, according to an embodiment.

FIG. 4I is a graph that illustrates an example of SNR versus target range for various integration times in the system 200' of FIG. 2D, according to an embodiment. The horizontal axis 402 indicates target range in units of meters (m) and the vertical axis 404 indicates SNR in units of decibels (dB). A first trace 450a depicts SNR values of the return beam 291 over the target range, where the system 200' is set to a first integration time (e.g., 3.2 µs). A second trace 450b depicts SNR values of the return beam 291 over the target range, where the system 200' is set to a second, shorter integration time (e.g., 1.6 µs). A third trace 450c depicts SNR values of the return beam 291 over the target range, where the system 200' is set to a third even shorter integration time (e.g., 800 nanoseconds, ns, 1 ns=$10^{-9}$ seconds). A fourth trace 450d depicts SNR values of the return beam 291 over the target range, where the system 200' is set to a fourth still shorter integration time (e.g., 400 ns). The traces 450a through 450d, collectively referenced hereinafter as traces 450, demonstrate that for a fixed target range, an increased SNR is achieved with increasing integration time. The traces 450 also demonstrate that for a fixed integration time, the SNR of the return beam 291 decreases with increased range, for the reasons previously discussed.

Conventional monostatic LIDAR systems typically select a fixed integration time (e.g., 1.6 µs) for the scanning at the range of angles 227 and resulting target ranges, so that the SNR associated with the fixed integration time exceeds a target SNR threshold indicated by horizontal dashed line 452 over the target range. It is here recognized that this results in relatively high integration times being used to scan the beam over the range of angles 227 in conventional monostatic LIDAR systems, integration times that are higher than needed at some angles.

Figure 4J:
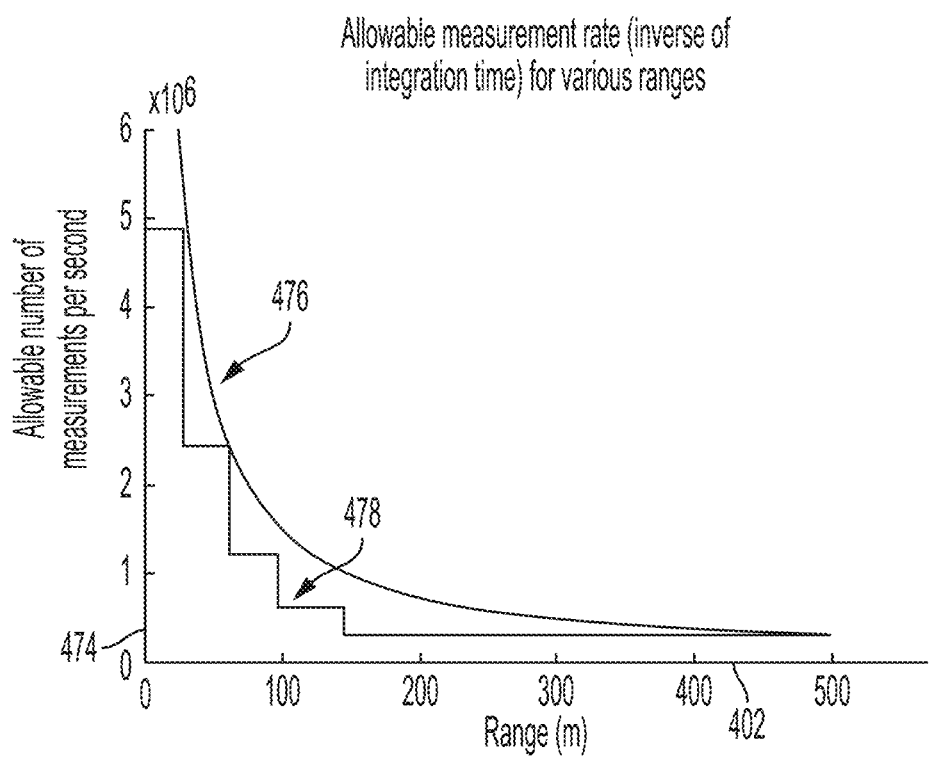
FIG. 4J is a graph that illustrates an example of a measurement rate versus target range in the system of FIG. 2D, according to an embodiment.

Here is presented a method for operating a LIDAR that addresses this noted drawback, including minimizing the integration time at each angle within the range of angles 227 using the target range at each angle, so to minimize the integration time over at least some angles 227. FIG. 4J is a graph that illustrates an example of a measurement rate versus target range used to operate a LIDAR, such as the system 200' of FIG. 2D, according to an embodiment. The horizontal axis 402 indicates target range in units of meters (m) and the vertical axis 474 indicates number of allowable measurements per unit time in units of number per second. Trace 476 depicts the number of allowable measurements per second at each target range. In an embodiment, trace 476 represents an inverse of the integration time, e.g. the number of return beams 291 that can be detected at each target range per second whereas integration time conveys how long it takes to process the return beam 291 at each target range. Trace 478 depicts a recipe for operating a LIDAR for a discrete number of allowable measurements per second at each of various target range steps. The trace 478 is based on power of 2 intervals for a given ADC (analog to digital conversion) rate. An advantage of trace 478 is that the number of digitized samples is a power of 2; and, thus, a digital signal processing implementation of a fast Fourier transform on such a length signal is more efficient.

5. VEHICLE CONTROL OVERVIEW

In some embodiments a vehicle is controlled at least in part based on data received from a hi-res Doppler LIDAR system mounted on the vehicle when the LIDAR is operated as described herein.

Figure 3A:
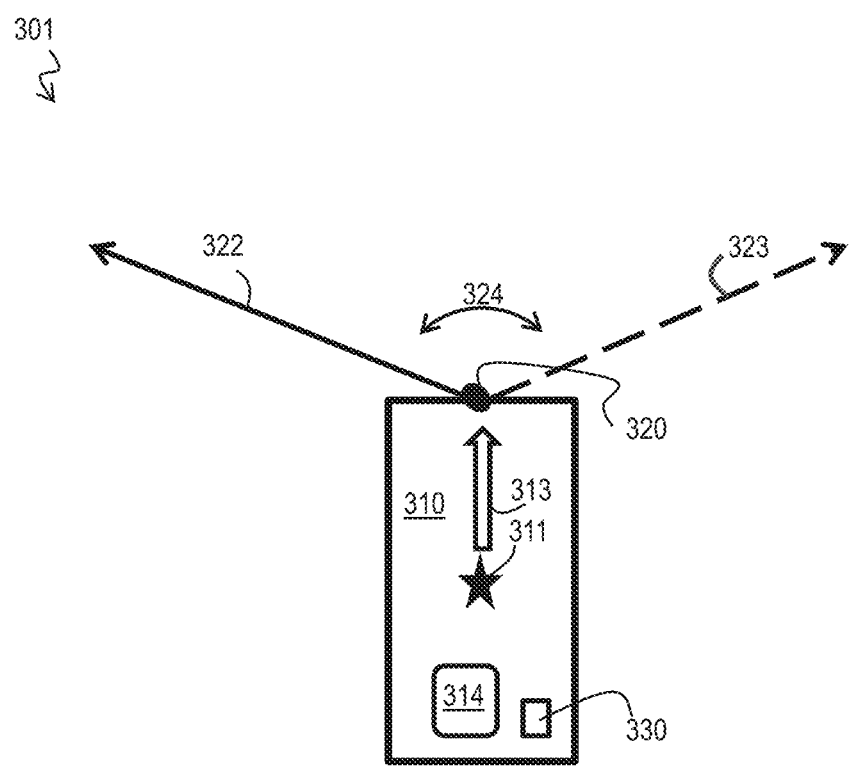
FIG. 3A is a block diagram that illustrates an example system that includes at least one hi-res LIDAR system mounted on a vehicle, according to an embodiment.

FIG. 3A is a block diagram that illustrates an example system 301 that includes at least one hi-res Doppler LIDAR system 320 mounted on a vehicle 310, according to an embodiment. In some embodiments, the LIDAR system 320 is similar to one of the LIDAR systems 200, 200'. The vehicle has a center of mass indicted by a star 311 and travels in a forward direction given by arrow 313. In some embodiments, the vehicle 310 includes a component, such as a steering or braking system (not shown), operated in response to a signal from a processor, such as the vehicle control module 272 of the processing system 250. In some embodiments, the vehicle has an on-board processor 314, such as chip set depicted in FIG. 8. In some embodiments, the on-board processor 314 is in wired or wireless communication with a remote processor, as depicted in FIG. 7. In an embodiment, the processing system 250 of the LIDAR system 200 is communicatively coupled with the on-board processor 314; or the processing system 250 of the LIDAR is used to perform the operations of the on-board processor 314 so that the vehicle control module 272 causes the processing system 250 to transmit one or more signals to the steering or braking system of the vehicle to control the direction and speed of the vehicle. The hi-res Doppler LIDAR uses a scanning beam 322 that sweeps from one side to another side, represented by future beam 323, through an azimuthal field of view 324, as well as through vertical angles (326 in FIG. 3B), illuminating spots in the surroundings of vehicle 310. In some embodiments, the field of view is 360 degrees of azimuth. In some embodiments the inclination angle field of view is from about +10 degrees to about −10 degrees or a subset thereof.

In some embodiments, the vehicle includes ancillary sensors (not shown), such as a GPS sensor, odometer, tachometer, temperature sensor, vacuum sensor, electrical voltage or current sensors, among others well known in the art. In some embodiments, a gyroscope 330 is included to provide rotation information.

Figure 3B:
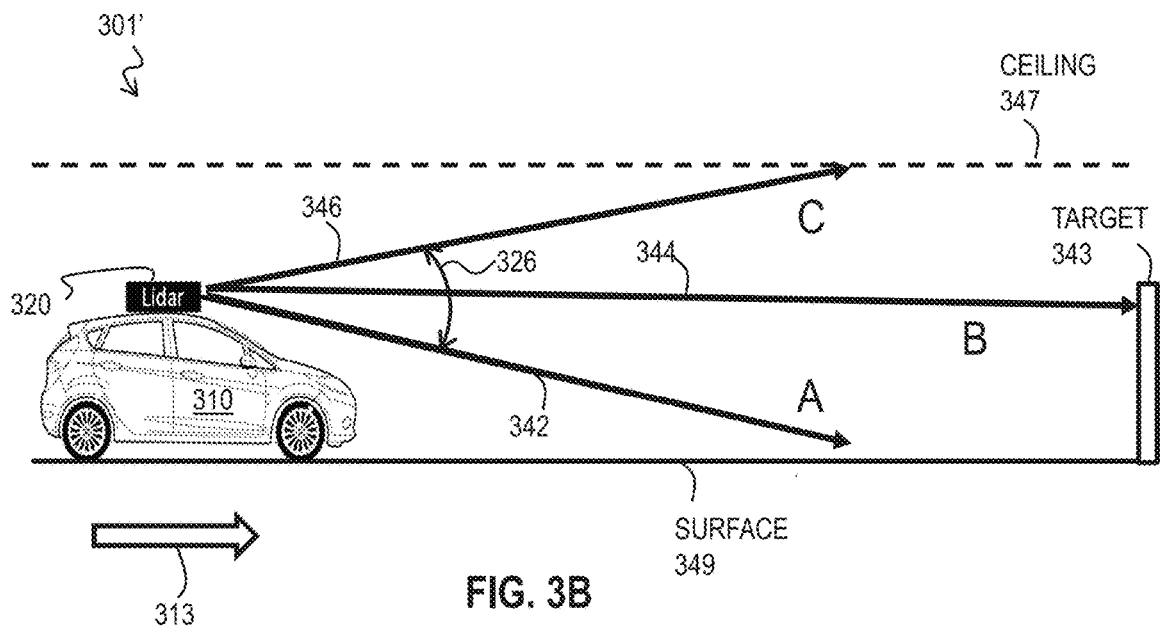
FIG. 3B is a block diagram that illustrates an example system that includes at least one hi-res LIDAR system mounted on a vehicle, according to an embodiment.

FIG. 3B is a block diagram that illustrates an example system 301' that includes at least one hi-res LIDAR system 320 mounted on the vehicle 310, according to an embodiment. In an embodiment, the LIDAR system 320 is similar to the system 200 or system 200'. In one embodiment, the vehicle 310 moves over the surface 349 (e.g., road) with the forward direction based on the arrow 313. The LIDAR system 320 scans over a range of angles 326 from a first beam 342 oriented at a first angle measured with respect to the arrow 313 to a second beam 346 oriented at a second angle measured with respect to the arrow 313. In one embodiment, the first angle and the second angle are vertical (inclination) angles within a vertical plane that is oriented about orthogonal with respect to the surface 349. For purposes of this description, "about orthogonal" means within ±20 degrees of a normal to the surface 349.

In designing the system 301', a predetermined maximum design range of the beams at each angle is determined and represents a maximum anticipated target range at each angle in the range 326. In other embodiments, the maximum design range at each angle is not predetermined but is regularly measured and updated in the memory of the processing system 250 at incremental time periods. In an embodiment, the first beam 342 is oriented toward the surface 349 (inclined downward) and intersects the surface 349 within some maximum design range from the vehicle 310. Thus, at the first angle, the system 320 does not consider targets positioned below the surface 349. In an example embodiment, the first angle of the first beam 342 is about −15 degrees or in a range from about −25 degrees to about −10 degrees with respect to the arrow 313; and the maximum design range is about 4 meters (m) or within a range from about 1 m to about 10 m, or in a range from about 2 m to about 6 m. In an embodiment, the second beam 346 is inclined upward (e.g., oriented toward the sky) and intersects a ceiling 347 above which the operation of vehicle 310 is not concerned, within some maximum design range from the vehicle 310. Thus, at the second angle the system 320 does not consider targets positioned above the ceiling 347. In an example embodiment, the ceiling 347 is at an altitude of about 12 m or in a range from about 8 m to about 15 m from the surface 349 (e.g., that defines an altitude of 0 m), the second angle of the second beam 346 is about 15 degrees or in a range from about 10 degrees to about 20 degrees with respect to the arrow 313; and the maximum design range is about 7 m or within a range from about 4 m to about 10 m or within a range from about 1 m to about 15 m. In some embodiments, the ceiling 347 altitude depends on an altitude of the LIDAR system 320 (e.g. about 1.5 m or in a range of about 1 m to about 4 m, where the surface 349 defines 0 m). In an embodiment, an intermediate beam 344 between the first beam 342 and second beam 346 is oriented about parallel with the arrow 313 and intersects a target 343 positioned at a maximum design range from the vehicle 310. FIG. 3B is not drawn to scale and in various embodiments target 343 is positioned at a much further distance from the vehicle 310 than appears in FIG. 3B. For purposes of this description, "about parallel" means within about ±10 degrees or within about 15 degrees of the arrow 313. In an example embodiment, the maximum design range of the target 343 is about 200 m, or within a range from about 150 m to about 300 m, or within a range from about 100 m to about 500 m, or within a range of about 100 m to about 1000 m or more.

Figure 5A:
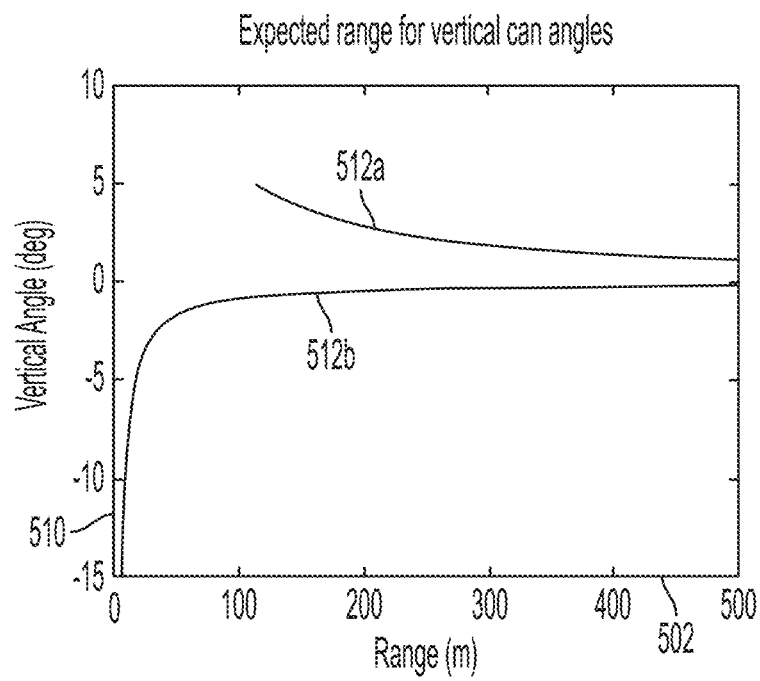
FIG. 5A is a graph that illustrates an example of a maximum design range for each vertical angle in the angle range in the system of FIG. 3B, according to an embodiment.

FIG. 5A is a graph that illustrates an example of the predetermined maximum design range for each vertical angle in the angle range in the system 320 of FIG. 3B, according to an embodiment. The horizontal axis 502 indicates target range in units of meters (m) and the vertical axis 510 indicates angle of the beam in units of degrees (deg). Trace 512a depicts the maximum design range for those beams with an upward inclination in the range of angles 326 with a positive angle with respect to arrow 313 (e.g., beam 346). Trace 512b depicts the maximum design range for those beams with a downward inclination in the range of angles 326 with a negative angle with respect to arrow 313 (e.g. beam 342).

Although FIG. 3B depicts the LIDAR system mounted on a vehicle 310 configured to travel over the surface 349, the embodiments of the present is not limited to this type of vehicle and the LIDAR system can be mounted to an air vehicle 310' (e.g. passenger air vehicle) that is configured to fly. In an embodiment, the vehicle 310' is configured to fly over a surface 349 where one or more targets 343 are present. FIG. 3D is a block diagram that illustrates an example system 301" that includes at least one hi-res LIDAR system 320 mounted on a vehicle 310' configured to fly over a surface 349, according to an embodiment. In an embodiment, the LIDAR system 320 operates in a similar manner as the LIDAR system 320 of the system 301', with the exception that the maximum design range of the first beam 342' at the first angle with respect to the arrow 313 is defined based on a floor 348 relative to the surface 349. In an example embodiment, the floor 348 has an altitude relative to the altitude of the system 320 in a range from about 0 m to about −10 m or in a range from about 0 m to about −2 m. In another example embodiment, the ceiling 347 has an altitude relative to the altitude of the system 320 in a range from about 0 m to about 10 m. In another example embodiment, the first angle is about −30 degrees or within a range from about −60 degrees to about −15 degrees. In some embodiments, the first angle would be equal and opposite to the second angle of the ceiling 347.

6. METHOD FOR OPTIMIZATION OF SCAN PATTERN IN COHERENT LIDAR SYSTEM

Figure 6:
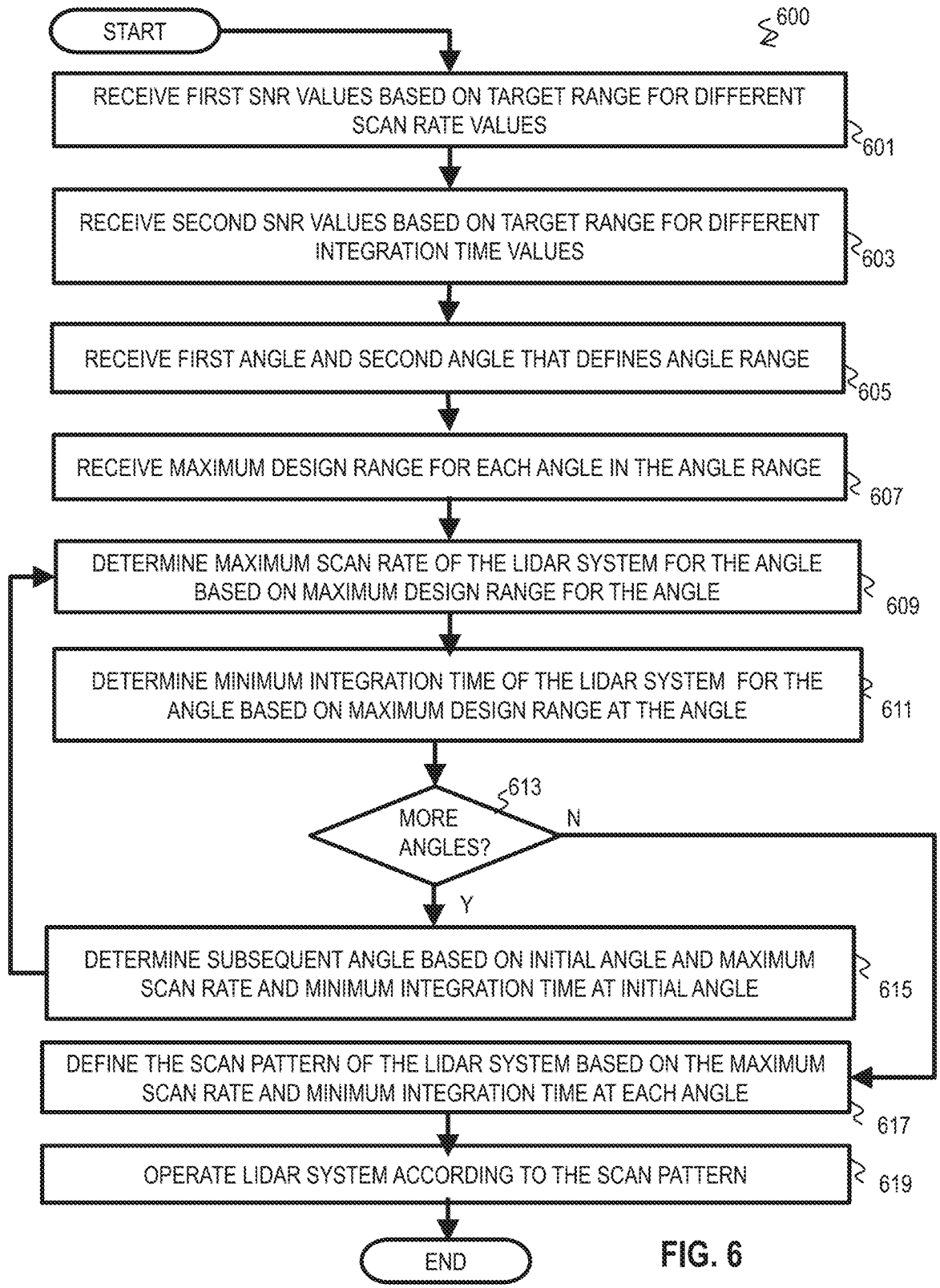
FIG. 6 is a flow chart that illustrates an example method for optimizing a scan pattern of a LIDAR system on an autonomous vehicle, according to an embodiment.

FIG. 6 is a flow chart that illustrates an example method 600 for optimizing a scan pattern of a LIDAR system on an autonomous vehicle. Although steps are depicted in FIG. 6, and in subsequent flowcharts as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 601, data is received on a processor that indicates first SNR values of a signal reflected by a target and detected by the LIDAR system based on values of a range of the target, where the first SNR values are for a respective value of a scan rate of the LIDAR system. In an embodiment, in step 601 the data is first SNR values of the focused return beam 291 on the fiber tip 217 in the system 200'. In another embodiment, in step 601 the data is first SNR values of the focused return beam 291 on the detector array 230 in the system 200. In one embodiment, the data includes values of traces 440a and/or trace 440b and/or trace 440c, or the equations or models that produce those traces, and which indicate SNR values of the return beam 291, where each trace 440 is for a respective value of the scan rate of the beam. In some embodiments, the data is not limited to traces 440a, 440b, 440c and includes SNR values of less or more curves than are depicted in FIG. 4G, where each SNR curve is based on a respective value of the scan rate and actual configuration of collimators and return tips or the equations or models that produce those traces. In other embodiments, the data includes SNR values that could be used to form the curve over the target range for each respective value of the scan rate. In an example embodiment, in step 601 the data is stored in a memory of the processing system 250 and each set of first SNR values is stored with an associated value of the scan rate of the LIDAR system. In one embodiment, in step 601 the first SNR values are obtained over a range from about 0 meters to about 500 meters (e.g. automotive vehicles) or within a range from about 0 meters to about 1000 meters (e.g. airborne vehicles) and for scan rate values from about 2000 deg/sec to about 6000 deg/sec or within a range from about 1000 deg/second to about 7000 deg/sec In some embodiments, the first SNR values are predetermined and are received by the processor in step 601. In other embodiments, the first SNR values are measured by the LIDAR system and subsequently received by the processor in step 601. In one embodiment, the data is input in step 601 using an input device 712 and/or uploaded to the memory 704 of the processing system 250 over a network link 778 from a local area network 780, internet 790 or external server 792, either unsolicited or in response to a query.

In step 603, data is received on a processor that indicates second SNR values of a signal reflected by a target and detected by the LIDAR system based on values of a range of the target, where the second SNR values are for a respective value of an integration time of the LIDAR system. In an embodiment, in step 603 the data is second SNR values of the focused return beam 291 in the system 200' for a respective integration time over which the beam is processed by the acquisition system 240 and/or processing system 250. In one embodiment, the data includes values of trace 450a and/or trace 450b and/or trace 450c and/or trace 450d or the equations or models that produce those traces, and which indicate SNR values of the return beam 291, where each trace 450 is for a respective value of the integration time that the beam is processed by the acquisition system 240 and/or processing system 250. In some embodiments, the data is not limited to traces 450a, 450b, 450c, 450d and includes less or more traces than are depicted in FIG. 4, where each SNR curve is based on a respective value of the integration time or the configuration of collimators and sensor tips, or the equations or models that produce those traces. In other embodiments, the data need not be a trace and instead is the SNR values used to form the trace over the target range for each respective value of the integration time. In an example embodiment, in step 603 the data is stored in a memory of the processing system 250 and each set of second SNR values is stored with an associated value of the integration time of the LIDAR system. In one embodiment, in step 603 the second SNR values are obtained over a range from about 0 meters to about 500 meters (e.g. automotive vehicles) or from a range from about 0 meters to about 1000 meters (e.g. airborne vehicles) and for integration time values from about 100 nanosecond (ns) to about 5 microseconds (µs).

In some embodiments, the second SNR values are predetermined and are received by the processor in step 603. In other embodiments, the second SNR values are measured by the LIDAR system and subsequently received by the processor in step 603. In one embodiment, the data is input in step 603 using an input device 712 and/or uploaded to the memory 704 of the processing system 250 over a network link 778 from a local area network 780, internet 790 or external server 792, either unsolicited or in response to a query.

In step 605, data is received on a processor that indicates the first angle and the second angle that defines the angle range 326. In one embodiment, in step 605 the first angle and the second angle are input using an input device 712 (e.g. mouse or pointing device 716) and/or are uploaded to the processing system 250 over a network link 778. In an embodiment the first angle is defined as the angle between the first beam 342 and the arrow 313 indicating the direction of travel of the vehicle 310 and the second angle is defined as the angle between the second beam 346 and the arrow 313. In an embodiment, the first angle and second angle are symmetric with respect to the arrow 313, e.g. the first angle and the second angle are equal and opposite to each other. In one embodiment, the first angle is selected so that the first beam 342 is oriented towards the surface 349 and the second angle is selected so that the second beam 346 is oriented away from the surface 349 and towards the ceiling 347, in one or two dimensions. In one embodiment, steps 601, 603 and 605 are simultaneously performed in one step where the data in steps 601, 603 and 605 is received at the processor in one simultaneously step.

In step 607, data is received on a processor that indicates the maximum design range of the target at each angle in the angle range. In an embodiment, the maximum design range is the predetermined maximum range of the target at each angle in the range of angles 326. In one embodiment, in step 607 the maximum design range of the target at each angle is provided by the traces 512a, 512b. The maximum design range data received in step 607 is not limited to the data of the traces 512a, 512b which is based on a specific range of angles 326. In one embodiment, traces 512a, 512b depict that the maximum design range for beams 342, 346 at the first angle and the second angle (e.g. <100 m) is less than the maximum design range of intermediate beam 344 at an angle between the first and second angle (e.g. >100 m). In another embodiment, the data in step 607 is provided over a first range of angles that is greater than the range of angles 326. In one embodiment, the data in step 607 is provided at an incremental angle over the angle range, wherein the incremental angle is selected in a range from about 0.005 degrees to about 0.01 degrees or in a range from about 0.0005 degrees to about 0.01 degrees.

In one example embodiment, the data in step 607 is input using an input device 712 (e.g. mouse or pointing device 716) and/or are uploaded to the processing system 250 over a network link 778. In some embodiments, the maximum design range is predetermined and received during step 607. In other embodiments, the system 200, 200' is used to measure the maximum design range at each angle in the angle range 326 and the maximum design range at each angle is subsequently received by the processing system 250 in step 607.

In step 609, a maximum scan rate of the LIDAR system is determined at each angle in the angle range 326 so that the SNR of the LIDAR system is greater than a minimum SNR threshold. At each angle, the maximum design range for that angle is first determined based on the received data in step 607. In one embodiment, the maximum design range for the angle is determined using trace 512a or 512b. First SNR values received in step 601 are then determined for the maximum design range at the angle and it is further determined which of these first SNR values exceed the minimum SNR threshold. In one embodiment, values of traces 440a, 440b, 440c are determined for a maximum design range (e.g. about 120 m) and it is further determined that the values of traces 440a, 440b exceeds the minimum SNR threshold 442. Among those first SNR values which exceed the minimum SNR threshold, the first SNR values with the maximum scan rate is selected and the maximum scan rate is determined in step 609 for that angle. In the above embodiment, among the values of the traces 440a, 440b which exceeds the minimum SNR threshold 442 at the maximum design range (e.g. about 120 m), the curve 440b values are selected as the maximum scan rate and the maximum scan rate (e.g. moderate scan rate associated with curve 440b) is determined in step 609 for that angle. In an embodiment, FIG. 4G depicts that the maximum scan rate determined in step 609 for the beams 342, 346 at the first and second angle (e.g. fast scan rate based on curve 440c) is greater than the maximum scan determined in step 609 for beam 344 at an angle between the first and second angle (e.g. moderate scan rate based on curve 440b). In an example embodiment, the determining of the maximum scan rate in step 609 ensures that beam walkoff 419 (FIG. 4E) of the return beam 291 on the fiber tip 217 is less than a ratio of a diameter of the image 418 of the return beam 291 on the tip 217. In an example embodiment, the ratio is about 0.5 or in a range from about 0.3 to about 0.7.

Figure 3C:
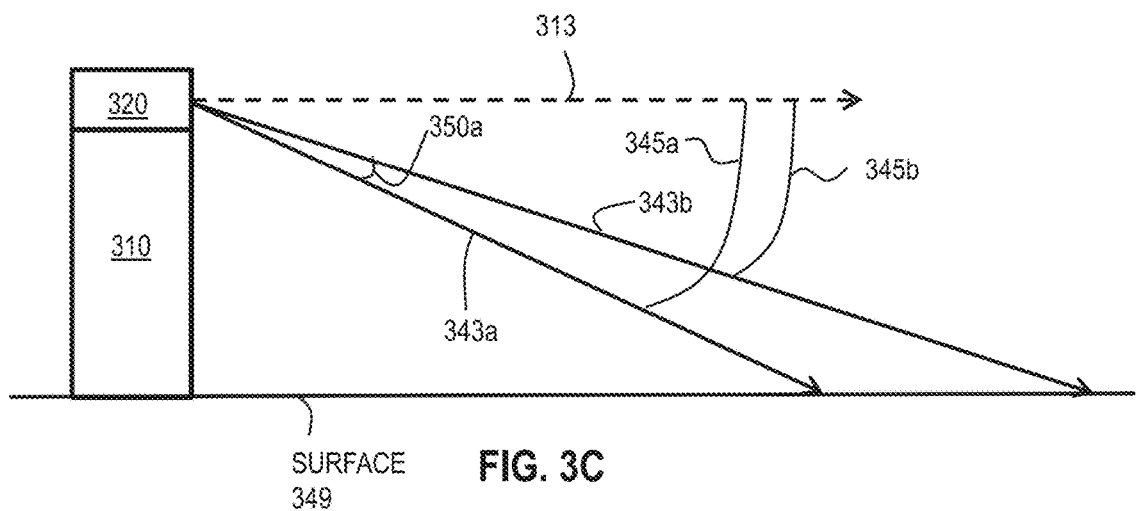
FIG. 3C is a block diagram that illustrates an example of transmitted beams at multiple angles from the LIDAR system of FIG. 3B, according to an embodiment.
Figure 3D:
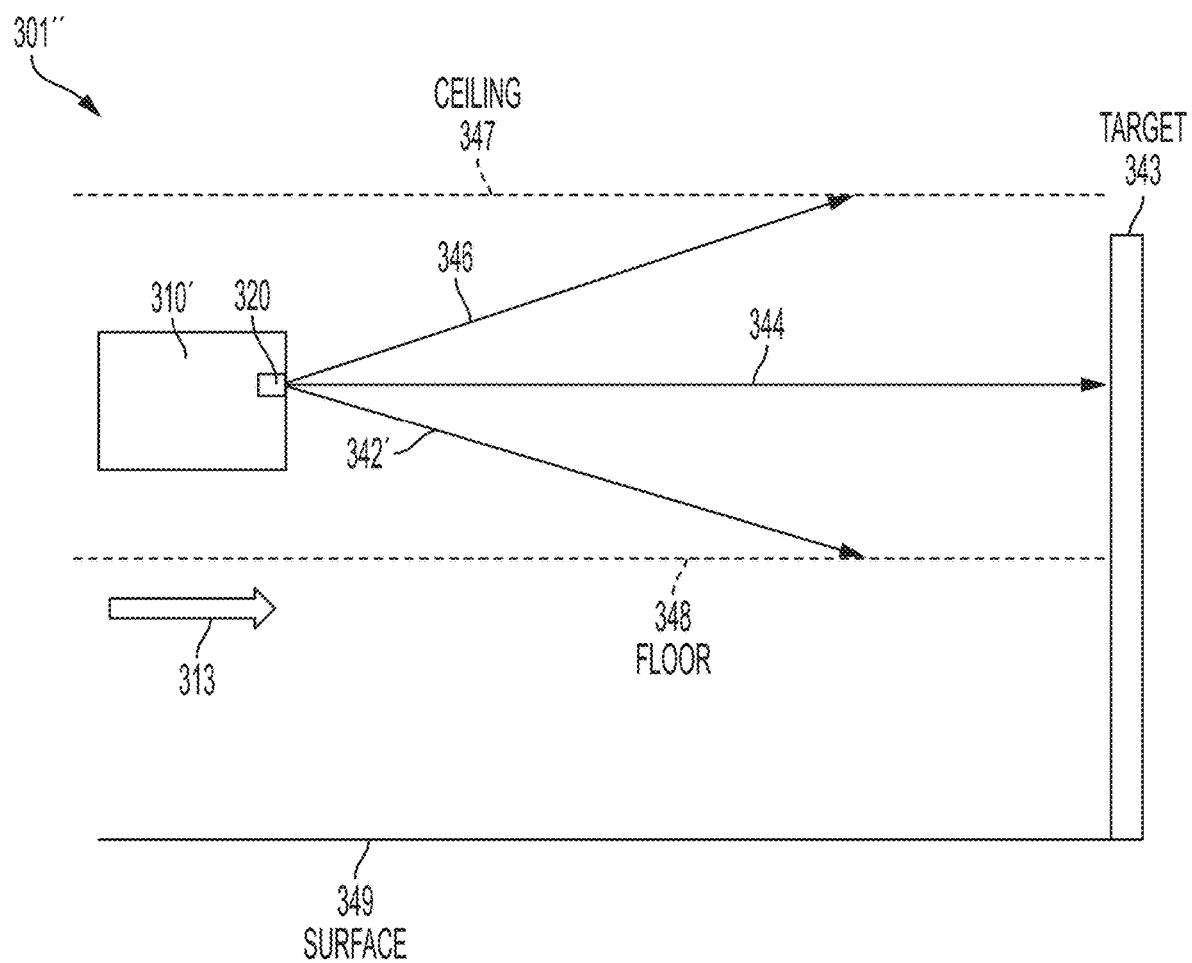
FIG. 3D is a block diagram that illustrates an example system that includes at least one hi-res LIDAR system mounted on a vehicle, according to an embodiment.

FIG. 3C is a block diagram that illustrates an example of transmitted beams 343a, 343b at multiple angles 345a, 345b from the LIDAR system 320 of FIG. 3B, according to an embodiment. In one embodiment, beams 343a, 343b are intermediate beams between first beam 342 and intermediate beam 344. In other embodiments, beam 343a is the first beam 342 and beam 343b is a subsequent beam that is processed after the first beam 342. In step 609, the maximum scan rate of the LIDAR system 320 is determined at the angle 345a. The maximum design range (e.g. 30 m) of the beam 343a at the angle 345a is first determined using the data in step 607. First SNR values from step 601 for the maximum design range are then determined. In an example embodiment, the first SNR values include values of traces 440a, 440b, 440c. It is then determined which of those first SNR values at the maximum design range exceeds the minimum SNR threshold. In the example embodiment, the values of the traces 440a, 440b, 440c at the maximum design range (e.g. 30 m) all exceed the minimum SNR threshold 442. It is then determined which of these first SNR values has the maximum scan rate and this maximum scan rate is determined in step 609 for that angle. In the example embodiment, the curve 440c has the maximum scan rate and thus this maximum scan rate is used to scan the beam 343a at the angle 345a. In an embodiment, FIG. 4I depicts that the minimum scan rate determined in step 611 for the beams 342, 346 at the first and second angle (e.g. 400 ns based on curve 450d) is shorter than the minimum integration time determined in step 611 for beam 344 at an angle between the first and second angle (e.g. 3.2 μs based on curve 450a).

In step 611, a minimum integration time of the LIDAR system is determined at each angle in the angle range 326 so that the SNR of the LIDAR system is greater than a minimum SNR threshold. At each angle, the maximum design range for that angle is first determined based on the received data in step 607. In one embodiment, the maximum design range for the angle is determined using trace 512a or 512b. Second SNR values received in step 603 are then determined for the maximum design range at the angle and it is further determined which of these second SNR values exceed the minimum SNR threshold. In one embodiment, values of traces 450a, 450b, 450c, 450d are determined for a maximum design range (e.g. about 120 m) and it is further determined that the values of traces 450a, 450b, 450c exceeds the minimum SNR threshold 452. Among those second SNR values which exceed the minimum SNR threshold, the second SNR values with the minimum integration time is selected and the minimum integration time is determined in step 611 for that angle. In the above embodiment, among the values of the curves 450a, 450b, 450c which exceeds the minimum SNR threshold 452 at the maximum design range (e.g. about 120 m), the curve 450c values are selected with the minimum integration time and the minimum integration time (e.g. about 800 ns) is determined in step 611 for that angle.

In step 611, the minimum integration time of the LIDAR system 320 is determined at the angle 345a. The maximum design range (e.g. 30 m) of the beam 343a at the angle 345a is first determined using the data in step 607. Second SNR values from step 603 for the maximum design range are then determined. In an example embodiment, the second SNR values include values of traces 450a, 450b, 450c, 450d. It is then determined which of those second SNR values at the maximum design range exceeds the minimum SNR threshold. In the example embodiment, the values of the traces 450a, 450b, 450c, 450d at the maximum design range (e.g. 30 m) all exceed the minimum SNR threshold 452. It is then determined which of these second SNR values has the minimum integration time and this minimum integration time is determined in step 611 for that angle. In the example embodiment, the curve 450d has the minimum integration time (e.g. about 400 ns) and thus this minimum integration time is used to process the beam 343a at the angle 345a.

In step 613, a determination is made whether additional angles remain in the angle range 326 to perform another iteration of steps 609, 611. In one embodiment, where an initial iteration of steps 609, 611 was at the first angle of the first beam 342 in the range 326, step 613 involves a determination of whether the previous iteration of steps 609, 611 was at or beyond the second angle of the second beam 346 in the angle range 326. In another embodiment, where an initial iteration of the steps 609, 611 was at the second angle of the range 326, step 613 involves a determination of whether the previous iteration of steps 609, 611 was at or beyond the first angle of the angle range 326. If step 613 determines that more angles in the range 326 remain, the method proceeds to block 615. If step 613 determines that no further angles in the range 326 remain, the method proceeds to block 617.

In step 615, a determination is made of a subsequent angle at which to iterate steps 609, 611 after having performed a previous iteration of steps 609, 611 at an initial angle. In an embodiment, FIG. 3C depicts a subsequent angle 345b of the subsequent beam 343b at which to iterate steps 609, 611 after having performed the previous iteration of steps 609, 611 at the initial beam 343a at the initial angle 345a. In an embodiment, step 615 involves a determination of the subsequent angle 345b and angle increment 350a between the initial angle 345a and the subsequent angle 345b. In one embodiment, the subsequent angle 345b is based on the initial angle 345a, the maximum scan rate at the angle 345a determined in step 609 and the minimum integration time at the angle 345a determined in step 611. In an example embodiment, the subsequent angle $\theta_s$ is based on the initial angle $\theta_i$, maximum scan rate $S_m$ and minimum integration time $I_m$ using:

$$\theta_s = \theta_i + S_m I_m \quad (5)$$

In an example embodiment, if the initial angle 345a is −15 degrees, the maximum scan rate is 15 degrees per second and the minimum integration time is 2 µs, then the subsequent angle 345b is about −14.97 degrees using Equation 5. After determining the subsequent angle in step 615, the method proceeds back to block 609 so that steps 609, 611 are iterated at the subsequent angle.

In step 617, after it is determined that no further iterations of steps 609, 611 need to be performed, a scan pattern of the LIDAR system is defined based on the maximum scan rate from step 609 and the minimum integration time from step 611 at each angle in the angle range 326. In one embodiment, the scan pattern includes the maximum scan pattern and minimum integration time for each angle in the angle range 326 between the first angle of the first beam 342 and the second angle of the second beam 346. In an example embodiment, the scan pattern is stored in a memory (e.g. memory 704) of the processing system 250. In another example embodiment, the angle increments between adjacent angles in the scan pattern is determined in step 615, e.g. the angle increment is the spacing between the subsequent angle and the initial angle in step 615. In another example embodiment, FIG. 3C depicts an angle increment 350a between a subsequent angle 345b and an initial angle 345a for purposes of step 615 and the scan pattern determined in step 617.

In step 619, the LIDAR system is operated according to the scan pattern determined in step 617. In an embodiment, in step 619 the beam of the LIDAR system is scanned in the angle range 326 over one or more cycles, where the scan rate of the beam at each angle is the maximum scan rate in the scan pattern for that angle and the integration time of the LIDAR system at each angle is the minimum integration time for that angle. In one embodiment, in step 619, at each angle the processing system 250 of the LIDAR system transmits one or more signals to the scanning optics 218 so that the scan rate at each angle is the maximum scan rate of the scan pattern for that angle. Additionally, in one embodiment, in step 619, at each angle the processing system 250 of the LIDAR system adjusts the integration time of the acquisition system 240 and/or processing system 250 for the return beam 291 received at each angle so that the integration time is the minimum integration time of the scan pattern for that angle. This advantageously ensures that the beam is scanned at the maximum scan rate and that the return beam is processed at the shortest integration time at each angle, while ensuring the LIDAR system maintains an adequate SNR at each angle.

Figure 5B:
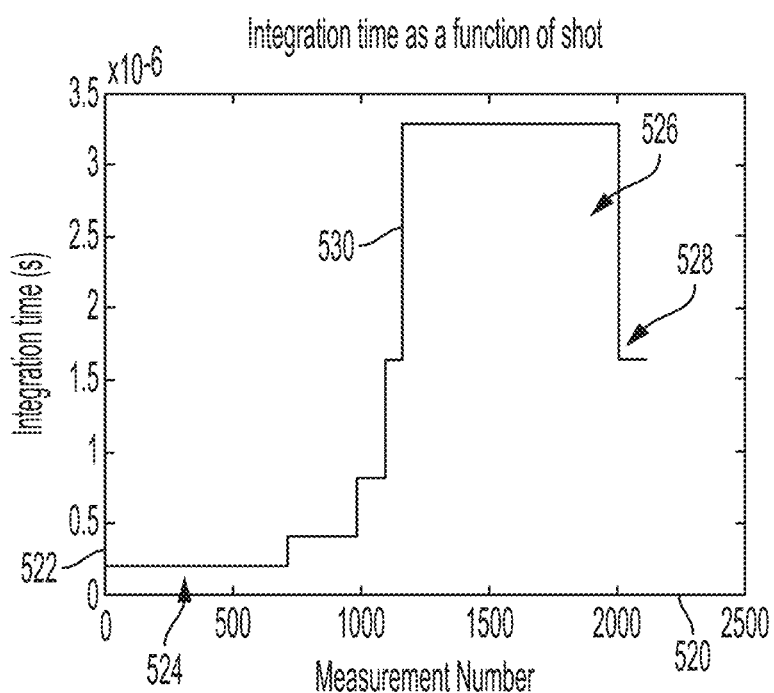
FIG. 5B is a graph that illustrates an example of integration time over the angle range in the system of FIG. 2D, according to an embodiment.

FIG. 5B is a graph that illustrates an example of integration time over the angle range 326 in the system of FIG. 2D, according to an embodiment. The horizontal axis 520 indicates measurement number and the vertical axis 522 indicates integration time in units of seconds (s) times $10^{-6}$ (i.e., µs). Trace 530 depicts the integration time of the LIDAR system during the operation of the LIDAR system in step 619. Measurement region 524 of the trace 530 indicates smaller integration times when the beam is oriented toward the surface 349 (e.g. first angle of first beam 342). Region 526 of the trace 530 indicates longer integration times when the beam is oriented about parallel to the surface 349 (e.g. intermediate beam 344). Region 528 of the trace 530 indicates smaller integration times when the beam is oriented toward the ceiling 347 (e.g. second angle of second beam 346).

Figure 5C:
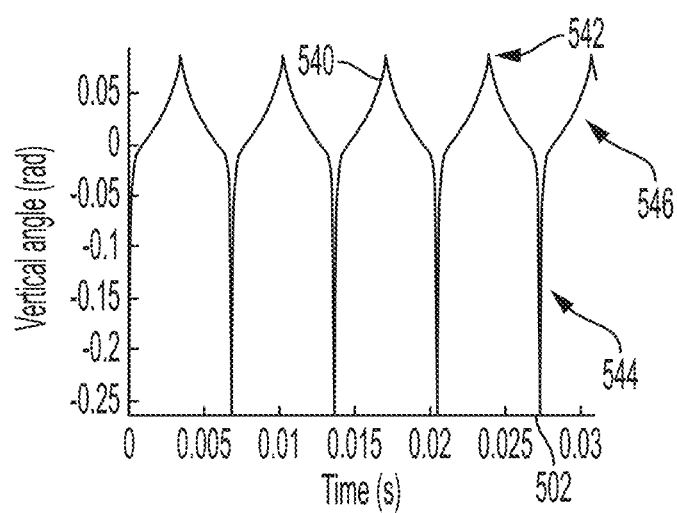
FIG. 5C is a graph that illustrates an example of the vertical angle over time over multiple angle ranges in the system of FIG. 2D, according to an embodiment.

FIG. 5C is a graph that illustrates an example of the vertical angle over time over multiple angle ranges in the system of FIG. 2D, according to an embodiment. The horizontal axis 502 is time in units of seconds (s) and the vertical axis is angle in units of radians (rad). Trace 540 depicts the angle of the beam over time during the scanning over the beam during multiple scan patterns in step 619. A slope of the curve 540 at an instant in time indicates the scan rate of the beam at that time. Region 542 of the trace 540 demonstrates a faster scan rate (e.g. high slope of the curve 540) when the beam is oriented towards the ceiling 347; region 544 of the trace 540 also demonstrates a faster scan rate (e.g. high slope of trace 540) when the beam is oriented towards the surface 349; and region 546 of the trace 540 demonstrates a slower scan rate (e.g. lower slope of the curve 540) when the beam is oriented about parallel with the surface 349.

In another embodiment, during or after step 619, the processor operates the vehicle 310 based at least in part on the data collected by the LIDAR system during step 619. In one embodiment, the processing system 250 of the LIDAR system and/or the processor 314 of the vehicle 310 transmit one or more signals to the steering and/or braking system of the vehicle based on the data collected by the LIDAR system in step 619. In one example embodiment, the processing system 250 transmits one or more signals to the steering or braking system of the vehicle 310 to control a position of the vehicle 310 in response to the LIDAR data. In other embodiments, the processing system 250 transmits one or more signals to the processor 314 of the vehicle 310 based on the LIDAR data collected in step 619 and the processor 314 in turn transmits one or more signals to the steering and braking system of the vehicle 310.

7. COMPUTATIONAL HARDWARE OVERVIEW

Figure 7:
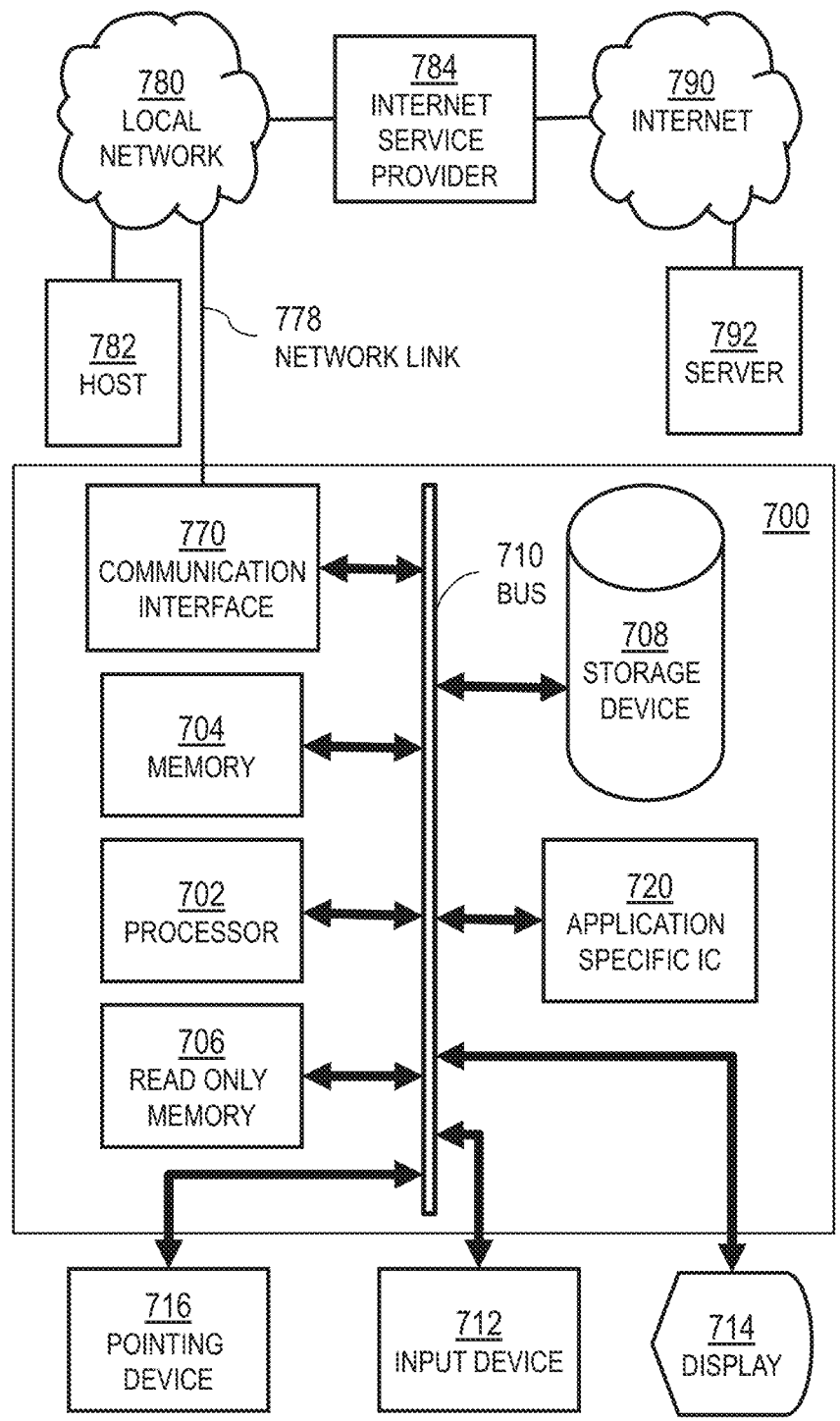
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
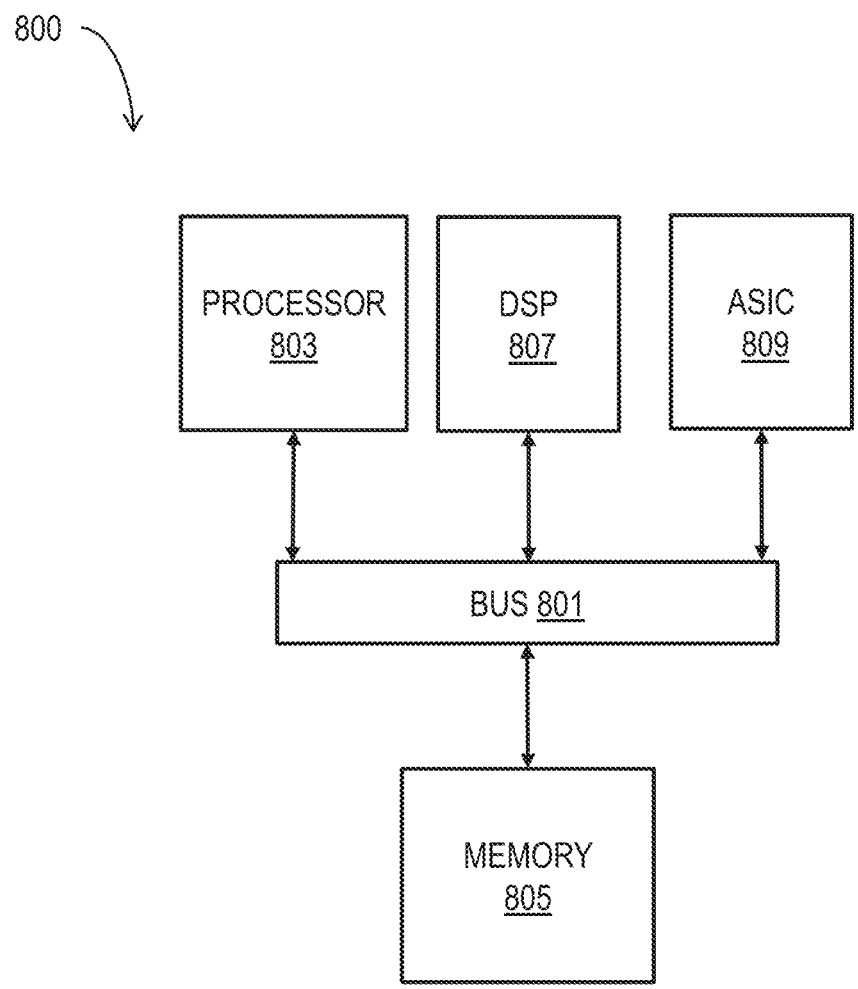
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

8. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

9. REFERENCES

The following references were cited herein, the entire contents of each of which are hereby incorporated by reference as if fully set forth herein, except for terminology inconsistent with that used herein.

What is claimed is:

1. A light detection and ranging (LIDAR) system, comprising:
    one or more scanning optics configured to transmit a transmit signal at a scan rate over an angle range defined by a first angle and a second angle; and
    one or more processors configured to:
        receive a first signal-to-noise ratio (SNR) value associated with the scan rate responsive to operation of the one or more scanning optics;
        receive a second SNR value associated with an integration time of processing a return signal received responsive to operation of the one or more scanning optics;
        identify a target range for a particular angle of the angle range, wherein the target range is greater than or equal to 1 meter and less than or equal to 15 meters or greater than or equal to 100 meters and less than or equal to 500 meters;
        determine a particular scan rate, for the particular angle and using the target range, responsive to comparing the first SNR value to an SNR threshold;
        determine a particular integration time, for the particular angle, responsive to comparing the second SNR value to the SNR threshold;
        determine a scan pattern using the particular scan rate and the particular integration time; and
        control operation of the one or more scanning optics using the scan pattern.

2. The LIDAR system of claim 1, further comprising a detector array that receives the return signal.

3. The LIDAR system of claim 1, wherein the target range is greater than 100 meters and the first SNR value is greater for a first value of the scan rate less than a second value of the scan rate.

4. The LIDAR system of claim 1, wherein the second SNR value is greater for a first value of the integration time that is greater than a second value of the integration time.

5. The LIDAR system of claim 1, wherein the scan rate is greater than or equal to 500 degrees per second and less than or equal to 5000 degrees or greater than or equal to 3000 degrees per second or less than or equal to 8000 degrees per second.

6. The LIDAR system of claim 1, wherein the target range is about 200 meters and a diameter of the transmit signal is about 1 centimeter.

7. The LIDAR system of claim 1, further comprising:
    a laser source;
    an optical waveguide coupled with the laser source; and
    a collimation optic configured to receive an optical signal from the optical waveguide and shape the optical signal into a target beam, the one or more scanning optics configured to receive the target beam from the collimation optic to transmit the transmit signal at the scan rate responsive to receiving the target beam.

8. The LIDAR system of claim 1, wherein the first SNR value is of a plurality of first SNR values, the second SNR value is of a plurality of second SNR values, and the one or more processors are configured to:
    determine the particular scan rate responsive to comparing the plurality of first SNR values to the SNR threshold; and
    determine the particular integration time responsive to comparing the plurality of second SNR values to the SNR threshold.

9. The LIDAR system of claim 1, wherein the first angle is between about negative 25 degrees to about negative 10 degrees with respect to a reference point, and the second angle is between about 10 degrees to about 20 degrees with respect to the reference point.

10. The LIDAR system of claim 1, wherein the one or more processors are configured to determine the particular scan rate to limit a walkoff distance between a first location from which the transmit signal is transmitted and a second location at which the return signal is received.

11. The LIDAR system of claim 1, wherein the one or more processors are configured to control operation of an autonomous vehicle.

12. A method, comprising:
    receiving a first signal-to-noise ratio (SNR) value associated with a scan rate at which one or more scanning optics transmit a transmit signal over an angle range defined by a first angle and a second angle;
    receiving a second SNR value associated with an integration time of processing a return signal received responsive to operation of the one or more scanning optics;
    identifying a target range for a particular angle of the angle range, wherein the target range is greater than or equal to 1 meter and less than or equal to 15 meters or greater than or equal to 100 meters and less than or equal to 500 meters;

determining a particular scan rate, for the particular angle and using the target range, responsive to comparing the first SNR value to an SNR threshold;

determining a particular integration time, for the particular angle, responsive to comparing the second SNR value to the SNR threshold;

determining a scan pattern using the particular scan rate and the particular integration time; and controlling operation of the one or more scanning optics using the scan pattern.

13. The method of claim 12, wherein the target range is greater than 100 meters and the first SNR value is greater for a first value of the scan rate less than a second value of the scan rate.

14. The method of claim 12, wherein the second SNR value is greater for a first value of the integration time that is greater than a second value of the integration time.

15. The method of claim 12, wherein the scan rate is greater than or equal to 500 degrees per second and less than or equal to 5000 degrees or greater than or equal to 3000 degrees per second or less than or equal to 8000 degrees per second.

16. The method of claim 12, wherein:
the first angle is between about negative 25 degrees to about negative 10 degrees with respect to a reference point, and the second angle is between about 10 degrees to about 20 degrees with respect to the reference point.

17. The method of claim 12, further comprising controlling operation of an autonomous vehicle.

18. An autonomous vehicle control system, comprising:
a LIDAR sensor configured to:
receive a first signal-to-noise ratio (SNR) value associated with a scan rate at which one or more scanning optics transmit a transmit signal over an angle range defined by a first angle and a second angle;

receive a second SNR value associated with an integration time of processing a return signal received responsive to operation of the one or more scanning optics;

identify a target range for a particular angle of the angle range, wherein the target range is greater than or equal to 1 meter and less than or equal to 15 meters or greater than or equal to 100 meters and less than or equal to 500 meters;

determine a particular scan rate, for the particular angle and using the target range, responsive to comparing the first SNR value to an SNR threshold;

determine a particular integration time, for the particular angle, responsive to comparing the second SNR value to the SNR threshold;

determine a scan pattern using the particular scan rate and the particular integration time; and control operation of the one or more scanning optics using the scan pattern to determine a range to the target; and a vehicle controller configured to control operation of an autonomous vehicle using the range to the target.

19. The autonomous vehicle control system of claim 18, wherein the scan rate is greater than or equal to 500 degrees per second and less than or equal to 5000 degrees or greater than or equal to 3000 degrees per second or less than or equal to 8000 degrees per second.

20. The autonomous vehicle control system of claim 18, wherein the first angle is from about negative 25 degrees to about negative 10 degrees with respect to a reference point, and the second angle is from about 10 degrees to about 20 degrees with respect to the reference point.

* * * * *